United States Patent
Pellerite et al.

(10) Patent No.: US 6,632,872 B1
(45) Date of Patent: Oct. 14, 2003

(54) ADHESIVE COMPOSITIONS INCLUDING SELF-ASSEMBLING MOLECULES, ADHESIVES, ARTICLES, AND METHODS

(75) Inventors: Mark J. Pellerite, Woodbury, MN (US); Alphonsus V. Pocius, Maplewood, MN (US); G. Marco Bommarito, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 319 days.

(21) Appl. No.: 09/664,687

(22) Filed: Sep. 19, 2000

(51) Int. Cl.$^7$ ................................................ C08L 27/12
(52) U.S. Cl. ................. 524/502; 524/506; 524/535; 523/452; 435/7.1; 428/343; 530/326; 528/25
(58) Field of Search ........................... 528/25; 524/535, 524/502, 506; 435/7.1; 530/326; 428/343; 523/452

(56) References Cited

U.S. PATENT DOCUMENTS

| | | | |
|---|---|---|---|
| 2,736,721 A | 2/1956 | Dexter | 260/42 |
| 4,145,382 A | 3/1979 | Hayashi et al. | 260/987 |
| 4,223,115 A | 9/1980 | Zalucha et al. | 525/455 |
| 4,352,855 A | 10/1982 | Hiraishi et al. | 428/320.4 |
| 4,369,244 A | 1/1983 | Eian et al. | 430/257 |
| 4,386,183 A | 5/1983 | Wempe | 524/405 |
| 4,406,912 A | 9/1983 | Downing | 428/352 |
| 4,478,967 A | 10/1984 | Eian et al. | 524/86 |

(List continued on next page.)

FOREIGN PATENT DOCUMENTS

| | | |
|---|---|---|
| EP | 692463 | 1/1976 |
| EP | 0 023 371 B1 | 2/1981 |
| JP | 57-155278 | 3/1981 |
| JP | 58-148815 | 9/1983 |
| JP | 58-201873 | 11/1983 |
| JP | 59-75974 | 4/1984 |
| JP | 60144377 | 7/1985 |
| JP | 62-7780 | 1/1987 |
| JP | 1-308473 | 12/1989 |
| JP | 4-46979 | 2/1992 |
| JP | 6-279061 | 10/1994 |
| JP | 7-48549 | 2/1995 |
| JP | 7-138543 | 5/1995 |
| JP | 8-12952 | 1/1996 |
| WO | WO 92/17515 | 10/1992 |
| WO | WO 94/21386 | 9/1994 |
| WO | WO 99/37626 | 7/1999 |
| WO | WO 00/29639 | 5/2000 |

OTHER PUBLICATIONS

Self–assembled monolayers of long–chain hydroxamic acids on the native oxides of metals. Folkers, J.P., et al. Langmuir, 11, pp. 813–824, (1995).*

(List continued on next page.)

Primary Examiner—David W. Wu
Assistant Examiner—Henry S. Hu
(74) Attorney, Agent, or Firm—Scott A. Bardell

(57) ABSTRACT

Adhesive compositions that include self-assembling molecules, adhesives and adhesive articles produced therefrom, and methods of making and using such adhesives.

31 Claims, 6 Drawing Sheets

U.S. PATENT DOCUMENTS

| | | | | |
|---|---|---|---|---|
| 4,511,641 | A | 4/1985 | Busman et al. | 430/158 |
| 4,554,238 | A | 11/1985 | Bushman | 430/258 |
| 4,587,038 | A | 5/1986 | Tamura | 252/511 |
| 4,647,402 | A | 3/1987 | Tamura | 252/511 |
| 4,775,554 | A | 10/1988 | Ponjee | 427/133 |
| 4,776,913 | A | 10/1988 | Goossens et al. | 156/230 |
| 4,889,718 | A | 12/1989 | Sugama | 428/343 |
| 5,078,791 | A | 1/1992 | Singh et al. | 106/287.14 |
| 5,106,561 | A | 4/1992 | Singh et al. | 264/165 |
| 5,112,882 | A | 5/1992 | Babu et al. | 522/158 |
| 5,173,365 | A | 12/1992 | Singh et al. | 428/333 |
| 5,204,126 | A | 4/1993 | Singh et al. | 425/412 |
| 5,214,119 | A | 5/1993 | Leihr et al. | 528/28 |
| 5,219,654 | A | 6/1993 | Singh et al. | 428/336 |
| 5,274,159 | A | 12/1993 | Pellerite et al. | 556/485 |
| 5,284,707 | A | 2/1994 | Ogawa et al. | 428/333 |
| 5,368,892 | A | 11/1994 | Berquier | 427/299 |
| 5,455,072 | A | 10/1995 | Bension et al. | |
| 5,510,481 | A * | 4/1996 | Bednarski et al. | 536/120 |
| 5,512,131 | A | 4/1996 | Kumar et al. | 156/655.1 |
| 5,580,605 | A | 12/1996 | Ogawa et al. | 427/155 |
| 5,639,808 | A * | 6/1997 | Coggio et al. | 523/452 |
| 5,644,007 | A | 7/1997 | Davidson et al. | 526/64 |
| 5,685,880 | A | 11/1997 | Masutani et al. | 8/94.22 |
| 5,686,549 | A * | 11/1997 | Grainger et al. | 528/25 |
| 5,688,864 | A | 11/1997 | Goodwin | 524/858 |
| 5,738,939 | A * | 4/1998 | Calhoun et al. | 428/343 |
| 5,763,191 | A * | 6/1998 | Knoll et al. | 435/7.1 |
| 5,766,698 | A | 6/1998 | Singh et al. | 427/601 |
| 6,025,438 | A * | 2/2000 | Hinterwaldner et al. | 525/112 |

OTHER PUBLICATIONS

ASTM D 1002–72, "Standard Test Method for Strength Properties of Adhesives in Shear By Tension Loading (Metal–to–Metal)," *1983 Annual Book of ASTM Standards*, vol. 02.04, American Society for Testing and Materials, pp. 60–64 (1972).

ASTM B–117–97, "Standard Practice for Operating Salt Spray (Fog) Apparatus," *Annual Book of ASTM Standards*, vol. 03.02, American Society for Testing and Materials, pp. 1–8 (1997).

Bram et al., "Self–Assembled Molecular Monolayers on Oxidized Inhomogenous Aluminum Surfaces," *Fresenius Journal of Analytical Chemistry*, vol. 358, pp. 108–111 (1997).

Cave et al., "Self–assembling Monolayer Silane Films As Adhesion Promoters," *Polymer*, vol. 33, No. 6, pp. 1162–1170 (1992).

Folkers et al., "Self–Assembled Monolayers of Long–Chain Hydroxamic Acids on the Native Oxides of Metals," *Langmuir*, vol. 11, pp. 813–824 (1995).

Scully et al., *EDS Electrochemical Impedance: Analysis and Interpretation*, ASTM special technical publication, *American Society for Testing and Materials*, Philadelphia, PA, Title page, Publication page, and Table of Contents (5 pp. total) (1993).

ASTM G 3–89, "Standard Practice for Conventions Applicable to Electrochemical Measurements in Corrosion Testing," *Annual Book of ASTM Standards*, vol. 14.02, pp. 36–44 (1989).

ASTM G 106–89, "Standard Practice for Verification of Algorithm and Equipment for Electrochemical Impedance Measurements," *Annual Book of ASTM Standards*, vol. 03.02, pp. 436–446 (1989).

A.W. Adamson, "The Solid–Liquid Interface–Contact Angle," *Physical Chemistry of Surfaces*, $4^{th}$ ed., John Wiley & Sons, Ch. 10, pp. 333–361 (1982).

J. G. Alsten, "Self–Assmbled Monolayers on Engineering Metals: Structure, Derivatization, and Utility," *Langmuir*, vol. 15, pp. 7605–7614 (1999).

R. Banga et al., "FTIR and AFM Studies of the Kinetics and Self–Assembly of Alkyltrichlorosilanes and (Perfluoroalkyl)trichlorosilanes onto Glass and Silicon," *Langmuir*, vol. 11, pp. 4393–4399 (1995).

P. Hoffman et al., "Vapor Phase Self–Assembly of Fluorinated Monolayers on Silicon and Germanium Oxide," *Langmuir*, vol. 13, pp. 1877–1880 (1997).

A.V. Pocius, "The Surface Preparation of Adherends for Adhesive Bonding," *Adhesion and Adhesives Technology, An Introduction*, Hanser Publishers, Ch. 7, pp. 147–182 (1997).

A. V. Pocius, "The Chemistry and Physical Properties of Structural Adhesives," *Adhesion and Adhesives Technology, An Introduction*, Hanser Publishers, Ch. 8, pp. 183–215 (1997).

H. Ron et al., "Self–Assembled Monolayers on Oxidized Metals. 4. Superior n–Alkanethiol Monolayers on Copper," *Journal of Physical Chemistry B*, vol. 102, pp. 9861–9869 (1998).

Donatas Satas (Ed.), *Handbook of Pressure Sensitive Adhesive Technology*, $2^{nd}$ Edition, Van Nostrand Reinhold, New York, NY, p. 172–173 (1989).

H. Tada et al., "Chemical Vapor Surface Modification of Porous Glass wih Fluoroalkyl–Functional Silanes.1. Characterization of the Molecular Layer," *Langmuir*, vol. 10, pp. 1472–1476 (1994).

C. P. Tripp et al., "Effect of Fluoroalkyl Substituents on the Reaction of Alkylchlorosilanes with Silica Surfaces," *Langmuir*, vol. 9, pp. 3518–3522 (1993).

M. W. Tsao et al., "Studies of Molecular Orientation and Order in Self–Assembled Semifluorinated n–Alkanethiols: Single and Dual Component Mixtures,"*Langmuir*, vol. 13, pp. 4317–4322 (1997).

H. Yanazawa et al., "Evaluatio of hydrophobic $SiO_2$ surfaces prepared by fluorinated organosilance treatments," *Journal of Adhesion Science and Technology*, vol. 4, pp. 145–153 (1990).

*Glossary of Terms Used in the Pressure Sensitive Tape Industry*, Pressure Sensitive Tape Council, pp. 3–8 Aug. (1989).

* cited by examiner

ADHESIVE COMPOSITIONS INCLUDING SELF-ASSEMBLING MOLECULES, ADHESIVES, ARTICLES, AND METHODS

BACKGROUND

Self-assembling molecules that form self-assembled films, typically, monolayer films, have been used in a variety of applications. For example, they have been used for modifying the properties of metal surfaces, forming small dimension patterns on solid substrates, producing sensors for biological molecules, and reducing friction and modifying the surface energy of the orifices of ink jet pens. They have also been used to provide a protective barrier against water and corrosive substances that typically attack metal surfaces, and to promote adhesion of overlying polymers to metal surfaces.

Self-assembled thin films are most often prepared by dip coating a substrate of interest in a dilute solution of the self-assembling amphiphile or by exposure to a vapor phase containing the amphiphile, and allowing film formation to proceed. The molecules spontaneously create a generally organized molecular architecture on the substrate. Once formed, the film does not redissolve in the solvent from which it was deposited, unlike polymer films that are not self-assembled. The long dwell times and flammable solvents often used make this processing user-unfriendly and difficult to adapt to a manufacturing setting. Thus, new means of providing self-assembled films are desired.

SUMMARY OF THE INVENTION

The compositions of this invention provide a means to eliminate costly or inconvenient steps in the generation of modified surfaces by incorporating a precursor to a self-assembling monolayer film into an adhesive composition. The self-assembling molecules are chosen such that they have an affinity for the substrate to be modified, a controlled solubility in the adhesive, and a molecular architecture such that when the self-assembling precursor finds the substrate surface, it attaches and spontaneously forms a film at the interface between the adhesive and the substrate.

Thus, the present invention provides adhesive compositions that include self-assembling molecules, adhesives and adhesive articles produced therefrom, and methods of making and using such adhesives. These materials are advantageous because the adhesive composition can serve a variety of functions. For example, the adhesive composition of the present invention can serve as a delivery vehicle for self-assembled films, such as low-surface-energy films, that can function as release agents for the adhesive component. A low-surface-energy film can then protect a surface, such as a metal oxide or other inorganic surfaces. The adhesive composition of the present invention can also be used as a self-priming adhesive, such that a surface to which an adhesive does not adhere well, e.g., an oily or otherwise contaminated surface, particularly a metal surface, does not need to be separately primed.

In one embodiment there is provided an adhesive composition that includes an adhesive component and a precursor of an in-situ self-assembled film capable of modifying a property of a surface to which the adhesive is applied. A method of modifying a property of a surface is also provided. The method includes applying to the surface an adhesive composition that includes an adhesive component and a precursor of an in-situ self-assembled film capable of modifying a property of the surface to which the adhesive composition is applied. Herein, a "precursor of an in-situ self-assembled film" is also referred to as "precursor" or "self-assembled film precursor" or "self-assembling molecules" and has the structure Y—Z—$(CQ_2)_n$—W—X wherein: Y is H, a halogen, a functional group capable of interacting with the adhesive, or an organic group optionally including a functional group capable of interacting with the adhesive (preferably, for certain embodiments the organic group is a perfluoroalkyl group); Z is a covalent bond or an organic linking group; Q is H or F; W is a covalent bond or an organic linking group; X is a nonionic group that interacts with a substrate on which the adhesive composition is disposed; and n is at least about 7; with the proviso that $(CQ_2)_n$ does not include CHF groups or alternating $CH_2CF_2$ groups; wherein the compound is substantially insoluble in neutral water characterized in that a mixture of greater than 0.1% by weight of the compound in neutral (pH about 7) water results in a multiphase composition. Herein, an interaction between any two materials (e.g., adhesive and functional group within self-assembled film or substrate and functional group within self-assembled film) can be attractive, repulsive, or a bonding interaction (e.g., covalent or ionic).

In another embodiment there is provided an adhesive bonded to a substrate. The adhesive includes an adhesive component and a self-assembled thin film prepared from a precursor having the structure described immediately above. Herein, a film refers to mono- or multimolecular layers, each layer being on the order of about 5 Angstroms to about 30 Angstroms thick, with the entire film being less than 500 Angstroms thick. The most preferred layer thickness is monomolecular.

Yet another embodiment of the invention includes articles with at least two substrates bonded together with the adhesives disclosed herein. Preferably, the substrates are metal substrates or metal oxide substrates. Preferably, the substrates are bonded together by an adhesive bond that retains its strength after exposure to elevated temperature (e.g., up to about 71° C.), elevated humidity (e.g., up to about 100%), salt water (e.g., at a concentration of about 2 wt % to about 6 wt %), or combinations thereof.

Another embodiment is directed to an adhesive composition that can provide a low-surface-energy film and a method of providing a low-surface-energy film on a surface. The adhesive composition includes an adhesive component and a precursor of an in-situ self-assembled low-surface-energy film having a surface energy less than about 35 dynes per centimeter (dynes/cm). The method includes applying to the surface such an adhesive composition. Preferably, the method further includes removing the adhesive component. In these low-surface-energy embodiments, preferably the precursor is of the structure Y—Z—$(CQ_2)_n$—W—X wherein: Y is H, F, or a perfluoroalkyl group of the formula $C_mF_{2m+1}$ where m is no greater than about 10; Z is a covalent bond; Q is H or F; W is a covalent bond or an organic linking group; X is a nonionic group that interacts with a substrate on which the adhesive composition is disposed; and n is at least about 7; with the proviso that $(CQ_2)_n$ does not include CHF groups or alternating $CH_2CF_2$ groups; and wherein at least about 0.1% by weight of the precursor in neutral water at 22° C. forms a multiphase composition.

Another embodiment is directed to an adhesive composition that is self-priming and a method of eliminating the need for priming a surface. The self-priming adhesive composition includes an adhesive component and a precursor of an in-situ self-assembled film. The method includes applying to the surface such a self-priming adhesive composition.

In these self-priming embodiments, the precursor is of the structure Y—Z—(CQ$_2$)$_n$—W—X wherein: Y is a functional group capable of interacting with the adhesive component, or an organic group optionally including a functional group capable of interacting with the adhesive component; Z is a covalent bond or an organic linking group; Q is H; W is a covalent bond or an organic linking group; X is a nonionic group that interacts with a substrate on which the adhesive composition is disposed; and n is at least about 7; and wherein at least about 0.1% by weight of the precursor in neutral water at 22° C. forms a multiphase composition.

Methods of making adhesive compositions are also provided. Such methods vary depending on the type of adhesive component used. As used herein, "a" or "an" or "the" are used interchangeably with "at least one," which mean "one or more" of the element being modified.

DETAILED DESCRIPTION OF PREFERRED EMBODIMENTS

Figure 1:
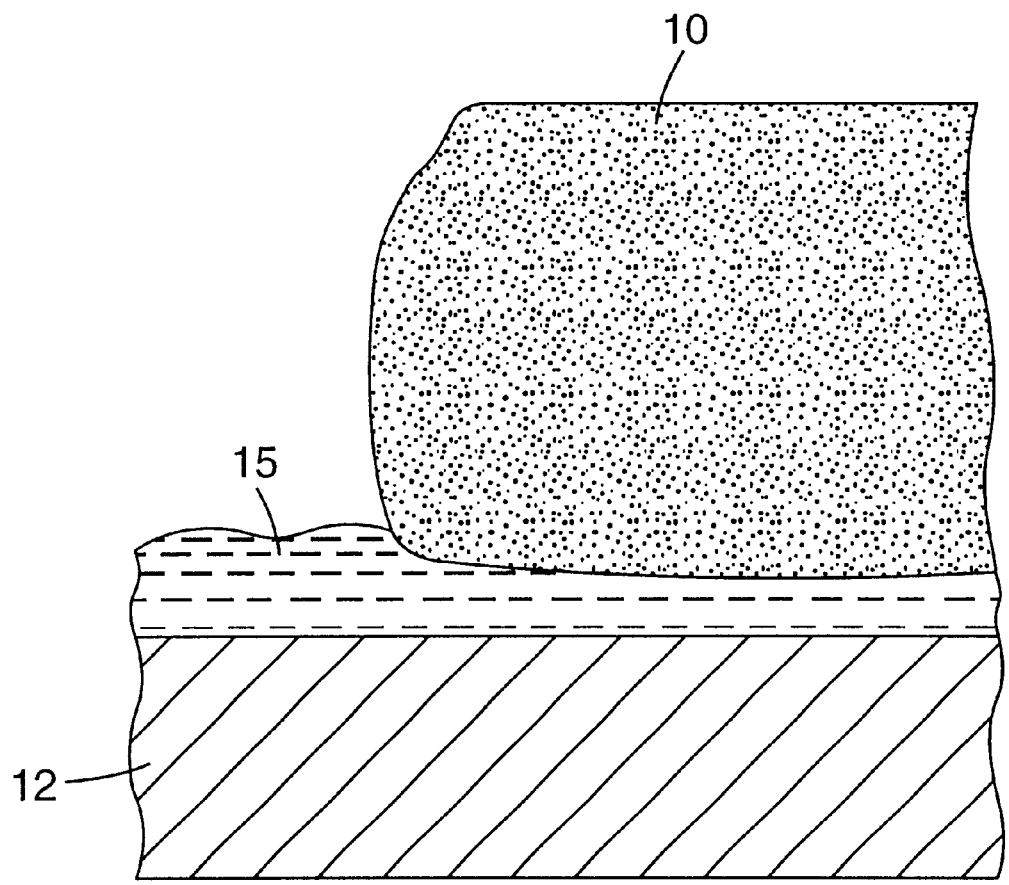
FIG. 1 is a schematic representation of a conventional structural adhesive on the surface of an oily inorganic substrate.

In general, surfaces of substrates are modified prior to adhesive bonding. For example, release surfaces are created by applying a layer of a low-surface-energy material from a suitable solvent onto a substrate. An adhesive is then applied to this low energy surface creating a construction from which the adhesive can be easily removed at a later time. Another example is the preparation of a surface for improved adhesive bonding and especially improved durability. In most cases, a layer of oil that may have been purposefully applied or may adventitiously occur accompanies metal surfaces. The industry has used many methods to prepare metal surfaces for improved durability. These include techniques as simple as solvent wiping and as complicated and expensive as anodization. (See, A. V. Pocius, *Adhesion and Adhesives Technology, An Introduction*, Hanser Publishers, Ch. 7, 1997). In many cases, the surface preparation is also followed by a corrosion inhibiting primer that is applied from a suitable solvent. For the generation of low energy surfaces or the modification of surfaces for improved bonding and durability, many steps are employed leading to extra cost and often using hazardous chemicals that are a problem for worker safety.

The present invention provides an adhesive composition that forms a delivery vehicle for self-assembling molecules. This composition is useful for providing a release agent or protective film on a surface, or a primer on a surface that can enhance adhesion to the surface, particularly an oil-contaminated surface, for example. Thus, the adhesive composition can function as its own primer or release agent.

Significantly, depending on the choice of materials, the incorporation of self-assembling molecules into an adhesive composition can improve the initial structural strength of the adhesive bond to a surface, extend the adhesive's range of compatibility with a variety of surfaces, particularly contaminated surfaces, and improve the durability of the adhesive bond to a surface. This method of enhancing adhesion is particularly advantageous for oily surfaces. Typically, adhesives have to be chosen that are compatible with the oily material.

Adhesives with oil-sorbing components typically suffer a reduction in properties once the oil has been sorbed by the adhesive; however, with the incorporation of self-assembling molecules, the oil-sorbing character of the adhesive is less of a concern. Although the inventors do not wish to be bound by theory, it is believed that the self-assembling molecules actively compete with the contaminant for adsorption sites on the substrate, leading to the displacement of oil.

Additionally, in this embodiment, the presence of the self-assembled film at the interface can increase initial adhesive bond strength. Preferably, there is an at least about 30% (more preferably, at least about 40%, and most preferably, at least about 200%) improvement in initial bond strength of an adhesive that includes self-assembling molecules, relative to the same adhesive without the self-assembling molecules as measured by ASTM D1002-72 specification for Lap Shear Strength. Furthermore, depending on the choice of self-assembling molecules, the self-assembling molecules can promote retention of bond strength (particularly in the selection of the "Y" group in the formula described herein) by providing barrier properties (particularly if the molecules include a long alkyl chain that forms a hydrophobic barrier to water) and perhaps by stabilizing the substrate/adhesive interface on either clean or oily surfaces (typically having up to about 0.4 mg/cm$^2$ of a hydrocarbon oil or up to about 0.6 mg/cm$^2$ of an emulsion oil). Preferably, there is an at least about 60% (more preferably, at least about 80%) retention of bond strength after salt spray exposure of the adhesive bond, as measured by ASTM D1002-72 specification for Lap Shear Strength and using the ASTM B117 salt spray exposure methodology on either clean or oily surfaces (typically having up to about 0.4 mg/cm$^2$ of a hydrocarbon oil or up to about 0.6 mg/cm$^2$ of an emulsion oil). With the preferred self-assembling precursors, not only is initial adhesive bond strength improved but durability of the adhesive bond in adverse environments is also improved. Significantly, there is preferably both an at least about 30% improvement in initial bond strength as well as an at least about 60% retention in bond strength after salt spray exposure of the adhesive bonds.

Figure 2:
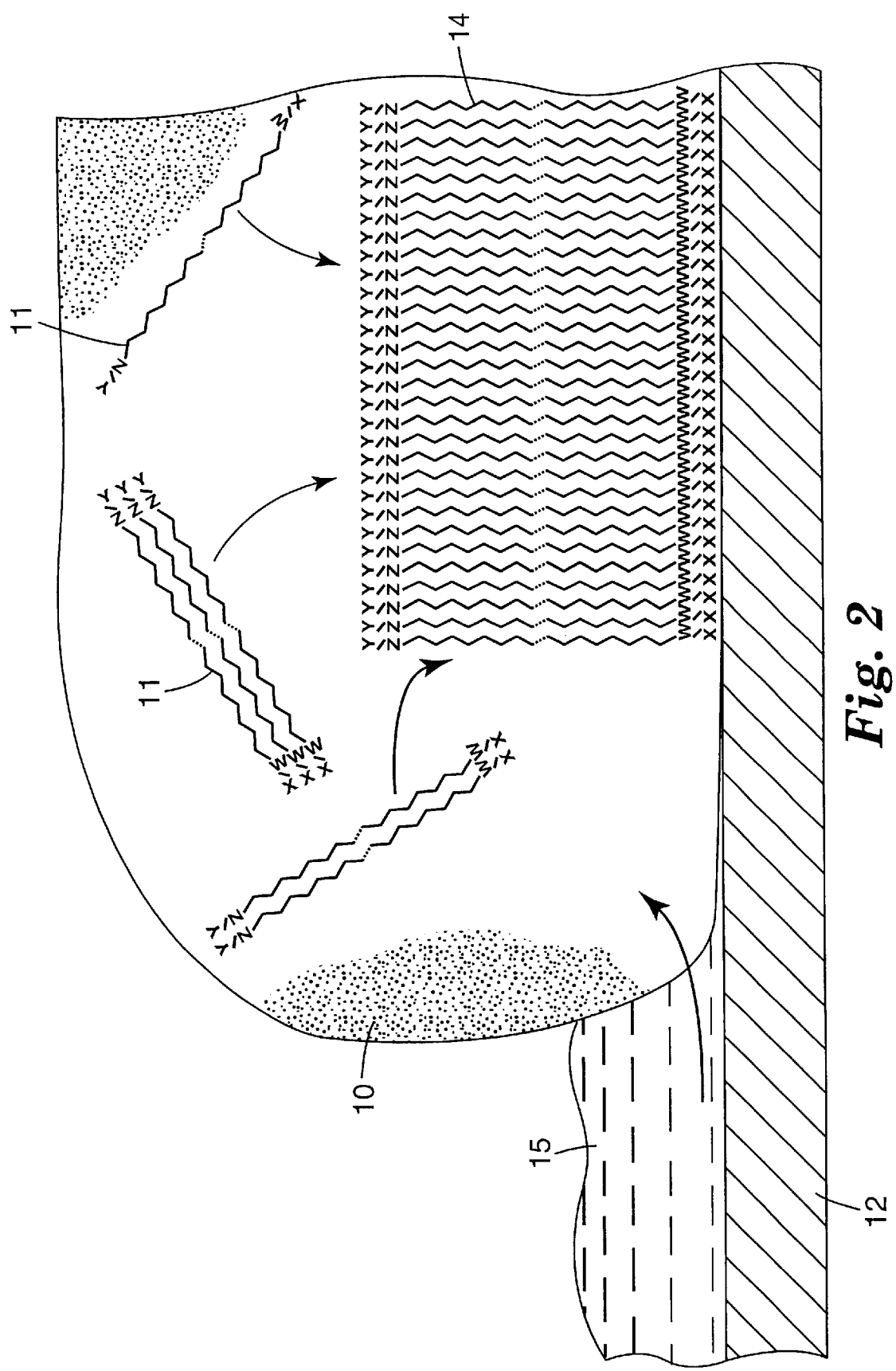
FIG. 2 is a schematic representation of a theoretical view of the action of self-assembling molecules at the interface between a structural adhesive of the invention and an oily inorganic substrate.

As shown in FIG. 1, a conventional structural adhesive 10 can be applied to a surface of inorganic substrate 12, such as a metal oxide, having oil contamination thereon. Clearly, the presence of the oil 15 prevents adhesive contact between the adhesive 10 and the substrate 12 resulting in no or low bond strength. FIG. 2 is a schematic representation of a theoretical view of the action of self-assembling molecules at the interface between a structural adhesive of the invention and an oily inorganic substrate. In this representation, the adhesive 10 includes a precursor to a self-assembled film (i.e., self-assembling molecules) 11 that form a self-assembled film 14. This film 14 displaces the oil 15 from the inorganic substrate surface 12 allowing an adhesive bond to form.

The adhesive compositions described herein can be used to make articles with at least two substrates bonded together with the adhesives disclosed herein. Preferably, the substrates are metal substrates or metal oxide substrates. Preferably, the substrates are bonded together by an adhesive bond that retains its strength after exposure to elevated temperature (e.g., up to about 71° C.), elevated humidity (e.g., up to about 100%), salt water (e.g., at a concentration of about 2 wt % to about 6 wt %), or combinations thereof.

Figure 3:
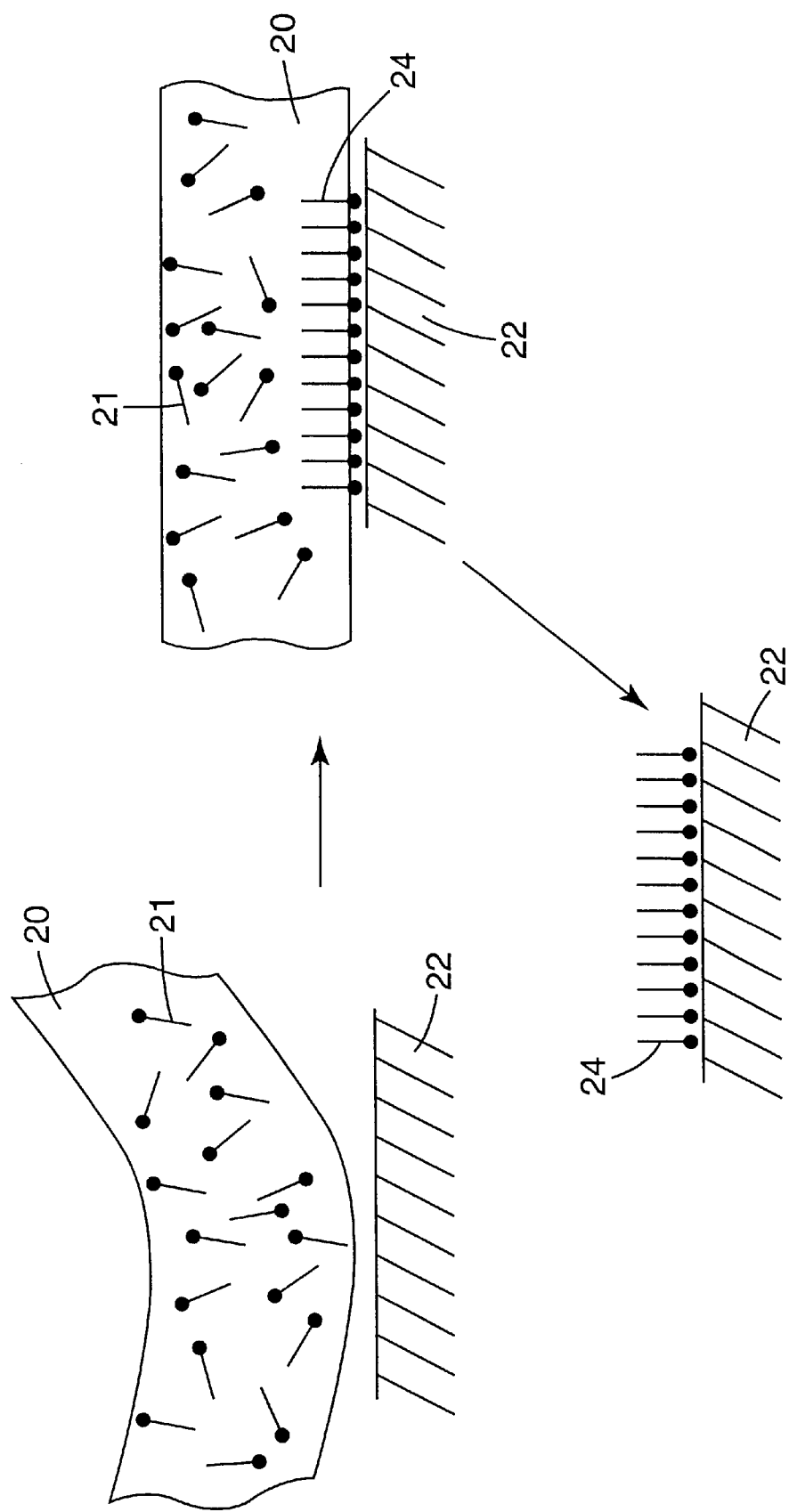
FIG. 3 is a schematic representation of delivery of a low-surface-energy (e.g., an alkyl- or fluoroalkyl-terminated) self-assembled film from a pressure sensitive adhesive.

Alternatively, depending on the choice of materials, the incorporation of self-assembling molecules into an adhesive composition can provide a unique method of applying a low-surface-energy protective coating to a substrate. For example, FIG. 3 is a schematic representation of delivery of a low-surface energy material (e.g., an alkyl- or fluoroalkyl-terminated self-assembled monolayer) to an inorganic substrate 22 from a pressure sensitive adhesive 20. In this representation, the pressure sensitive adhesive 20 includes a precursor to a self-assembled film (i.e., self-assembling molecules) 21 that form a self-assembled film 24. The film 24 is formed on the inorganic substrate 22 when the adhesive 20 is laminated to the substrate and allowed to dwell for an appropriate time. Removal of the adhesive 20 leaves the substrate 22 coated with the self-assembled film 24.

Such low-surface-energy protective coatings are generally prepared using alkyl- or fluoroalkyl-terminated self-assembled film precursors. Such coatings (i.e., films) exhibit surface energies of less than about 35 dynes/cm as measured by standard contact angle methods such as the Zisman critical surface tension or the Girifalco-Good-Fowkes treatment. These techniques are described in A. W. Adamson, *Physical Chemistry of Surfaces*, 4$^{th}$ ed., John Wiley & Sons, Ch. 10, 1982. Low-surface-energy films can be useful in the area of antisoiling coatings (e.g., silanes) for glass and optical substrates such as antireflective multilayer film stacks. Such articles require durable, abrasion-resistant, low-surface-energy treatments of extreme uniformity and less than about 100 Angstroms in thickness so as to not disrupt the optical characteristics of the film stack. Other low-surface-energy materials can be deposited using the adhesive compositions of the present invention to modify metal-containing surfaces (e.g., metals and metal oxides). These include, for example, hydrocarbon and fluorocarbon thiols, carboxylic acids, phosphate and phosphonate derivatives, and benzotriazoles.

The adhesive composition of the present invention includes an adhesive component and a precursor of an in-situ self-assembled film capable of modifying at least one property of a surface (e.g., surface energy, wetting characteristics, transport properties, adhesive bond durability, initial bond strength) to which the adhesive composition is applied. Herein, an "in-situ self-assembled film" is a film (typically, in the form of a monomolecular layer) that is formed at the substrate/adhesive interface upon applying the adhesive of the invention to a substrate. Thus, the self-assembled film is not applied as a separate layer (e.g., separate primer or release layer). Herein, a film refers to mono- or multimolecular layers, each layer being on the order of about 5 Angstroms to about 30 Angstroms thick, with the entire film being less than 500 Angstroms thick. The most preferred layer thickness is monomolecular.

The precursor to the in-situ self-assembled film is capable of modifying at least one property of a surface to which the adhesive composition is applied. The effect of self-assembly can be detected in a number of ways. In the case of application of a low-surface-energy film, its presence can be detected by well-known contact angle and spectroscopic techniques. In the case of application of a self-assembled film for durability enhancement, the effect of the film can be detected by Electrochemical Impedance Spectroscopy (EIS). Typically, the surface is modified with respect to at least one property to cause a modification in the interaction between the surface and the adhesive component. This modification of at least one property of the surface can result in improved adhesion of the adhesive component to the surface without the use of a separate primer or priming technique compared to the same adhesive composition without the precursor of the in-situ self-assembled film. Alternatively, this modification of at least one property of the surface can result in improved release of the adhesive component from the surface without a separate release material compared to the same adhesive composition without the precursor of the in-situ self-assembled film.

The self-assembling molecules form a self-assembled film. As used herein, "self-assembled" (and variations thereof) refers to the spontaneous arrangement of atoms and molecules into ordered, functional entities. One can design and set in motion the process of self-assembly, but once it is initiated, it proceeds according to its own internal plan. The product of self-assembly is an energetically stable system whose form and function are determined by its component parts. It will be understood by those skilled in the art that the molecular architecture that results from the self-assembly of molecules is not necessarily uniform over an entire surface. Thus, such uniformity is not a requirement of the films formed using the compositions and methods of the present invention.

Typically, the resultant self-assembled film is of a thickness of a monolayer of molecules (which is typically less than about 30 Angstroms thick), although it can be greater than a monolayer. The film can be continuous or discontinuous. A continuous film means a layer of self-assembled molecules that occludes the entire interface between the adhesive and the substrate. A discontinuous film means a film that occurs in islands, each island formed from the self-assembling molecules, but with space between the islands in which the adhesive, without self-assembled molecules, is in contact with the substrate.

The adhesive composition preferably has a storage stability of at least about one month. Storage stability will depend upon the type of adhesive in which the self-assembled film precursor is dispersed. Storage stability will also depend upon storage conditions. For example, some one-part epoxy adhesives may have to be stored in a freezer in order to obtain reasonable storage stability.

In a particularly preferred embodiment, the present invention provides an adhesive bonded to a substrate (e.g., a backing of a tape, a metal surface, a glass surface, etc.) that includes an adhesive and a self-assembled film (which can be in the form of a discontinuous monolayer) prepared from at least one precursor having the structure:

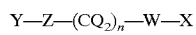

wherein: Y is H, a halogen, a functional group capable of interacting with the adhesive component, or an organic group optionally containing at least one functional group capable of interacting with the adhesive component (preferably, for certain embodiments the organic group is a perfluoroalkyl group); Z is a covalent bond or an organic linking group; Q is H or F; W is a covalent bond or an organic linking group; X is a nonionic group that interacts with a substrate on which the adhesive composition is disposed; and n is at least about 7. In such precursors, however, the $(CQ_2)_n$ group does not include CHF groups or alternating $CH_2CF_2$ groups.

The substrate on which the adhesive is disposed can be any of a wide variety of materials, depending on the desired application. The substrate can include backing materials typically used in adhesive articles or other substrates. Examples of backing materials for adhesive articles (e.g., tapes) include paper, polymeric film, a woven or nonwoven web, metal foil, glass cloth, etc. The substrate can include materials that are to be protected by depositing a self-assembled film. Examples of such substrates to which a low energy protective film is delivered include optical, electronic, or decorative components made from metals, metal oxides, glass, and ceramics. The substrate can include materials to which the adhesive is to be applied for corrosion protection and adhesive bond durability enhancement. Examples of such substrates that are primed for enhancing adhesion of the adhesive include metals such as steel, galvanized steel, zinc, and aluminum as well as glass.

Self-assembled Film Precursor

The precursor is a compound of the structure Y—Z—$(CQ_2)_n$—W—X wherein: Y is H, a halogen, a functional group capable of interacting (i.e., interacting physically or chemically, which can be covalent or ionic, for example) with the adhesive component, or an organic group optionally containing at least one functional group capable of interacting (i.e., interacting physically or chemically, which can be covalent or ionic, for example) with the adhesive component; Z is a covalent bond or an organic linking group; Q is H or F; W is a covalent bond or an organic linking group; X is a nonionic organic group that interacts with a substrate (e.g., the backing of a tape, metal surface, glass, glass cloth, or any surface to which X displays an affinity) on which the adhesive composition is disposed; and n is at least about 7 (preferably, n is no greater than about 20, and more preferably, n is about 7 to about 16); with the proviso that $(CQ_2)_n$ does not include CHF groups or alternating $CH_2CF_2$ groups; wherein the compound is substantially insoluble in neutral water characterized in that a mixture of greater than 0.1% by weight of the compound in neutral (pH about 7) water results in a multiphase composition. Multiphase means that more than one phase is present, e.g., a solid and liquid water or two immiscible liquids. Compounds of this formula can be evaluated for self-assembly readily by one skilled in the art with techniques such as ellipsometry, for example.

As used herein, the term "organic group" means a hydrocarbon group that is classified as an aliphatic group, cyclic group, or combination of aliphatic and cyclic groups (e.g., alkaryl and aralkyl groups). In the context of the present invention, the term "aliphatic group" means a saturated or unsaturated linear or branched hydrocarbon group. This term is used to encompass alkyl, alkenyl, and alkynyl groups, for example. The term "alkyl group" or "alkylene group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" or "alkenylene group" means an unsaturated, linear or branched hydrocarbon group with one or more carbon-carbon double bonds, such as a vinyl group. The term "alkynyl group" or "alkynylene group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" or "arylene group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

Substitution is anticipated in the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, or S atoms, for example, in the chain as well as carbonyl groups or other conventional substitution. Where the term "moiety" is used to describe a chemical compound or substituent, only an unsubstituted chemical material is intended to be included. For example, the phrase "alkyl group" is intended to include not only pure saturated hydrocarbon alkyl substituents, such as methyl, ethyl, propyl, t-butyl, and the like, but also alkyl substituents bearing further substituents (e.g., functional groups or heteroatoms) known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure saturated hydrocarbon alkyl substituents, such as methyl, ethyl, propyl, t-butyl, cyclohexyl, and the like.

Preferably, Y is H, a halogen (i.e., halogen atom), an amino group, a hydroxyl group, a thiol group, or a $C_1$–$C_{15}$ organic group (more preferably, a $C_1$–$C_{10}$ organic group) optionally containing a thiol group, an amino group, a hydroxyl group, a halogen, or a combination thereof. Such organic groups can include one or more of any substituent. For certain preferred embodiments, Y is a group that chemically interacts (i.e., forming covalent or ionic bonds) with the adhesive component. Examples of such Y groups include an amino group (—NH$_2$), a (meth)acryloyl group

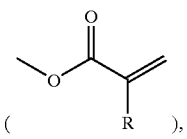

a (meth)acrylamido group

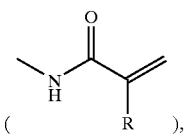

a hydroxyl group (—OH), an oxiranyl group

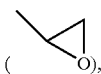

a vinyl group (—CH=CH₂), a thiol group (—SH), an aziridinyl group

a thiiranyl group

wherein R can be H or methyl, or combinations thereof.

For certain preferred embodiments, Z and W are each independently covalent bonds. For certain other preferred embodiments, Z and W are each independently an organic linking group, which can include linear, branched, or cyclic structures that may be saturated or unsaturated. Preferably, each divalent Z or W group is independently a linear group that includes heteroatoms and/or functional groups. Examples include a divalent alkylene group, arylene group, or mixture thereof, substituted with one or more heteroatoms (e.g., oxygen, nitrogen, or sulfur), functional groups (e.g., carbonyl, amido, or sulfonamido), or both, containing about 2 to about 16 carbon atoms (preferably, about 3 to about carbon atoms). Preferred structures for Z and W should be chosen such that they do not inhibit self-assembly.

For certain preferred embodiments, X is a thiol group (—SH), a monophosphate group, a phosphonate or phosphonic acid group (—P(O)(OH)₂), a hydroxamic acid group (—C(O)NHOH), a carboxylic acid group (—C(O)OH), an isonitrile group, a silyl group, a heterocyclic aromatic group (e.g., benzotriazolyl

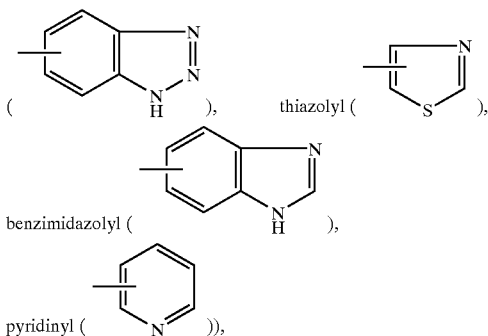

for a disulfide group (—S—S—). More preferably, X is a thiol group, a monophosphate group, a phosphonate group, a carboxylic acid group, a silyl group, or a benzotriazole group. For aluminum oxide surfaces, preferably X includes a phosphonic acid group (—P(O)(OH)₂), a hydroxamic acid group (—C(O)NHOH), or a carboxylic acid group (—C(O)OH). For iron oxide or steel surfaces, preferably X includes a hydroxamic acid group (—C(O)NHOH). For copper oxide, preferably X includes a hydroxamic acid group (—C(O)NHOH), a thiol group (—SH), a monophosphate group, a phosphonate or phosphonic acid group, a triazolyl group, a thiazolyl group, a benzimidazolyl group, or a pyridinyl group. For silicon oxide or glass, preferably X includes a silyl group of the formula SiR₃ wherein each R is independently —OCH₃, —OCH₂CH₃, acetoxy, or Cl (preferably, Cl). For gold, copper, and silver, preferably X is a thiol group (—SH) or a disulfide group (—S—S—). For platinum, preferably X includes a pyridinyl group

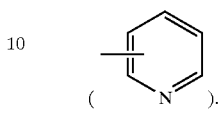

For each of the two general embodiments described herein, the preferred formulas for the self-assembled film precursors are described below.

The self-assembled film precursor is present in the adhesive composition in an amount that provides a desired result. Typically, and preferably, the precursor is present in the adhesive composition in an amount of about 0.1 weight percent to about 2 weight percent, based on the weight of the adhesive, as applied.

Adhesive Component

The adhesive component of the adhesive composition can be chosen from a wide variety of adhesives. It can be a thermoset adhesive, i.e., one that is formulated from chemicals, resins, and oligomers that irreversibly form a cured material. The term "thermoset" adhesive is used herein to refer to adhesives formed from reactive systems that irreversibly cure upon the application of heat and/or other sources of energy, such as E-beam, ultraviolet, visible light, etc., or with time upon the addition of a chemical catalyst, moisture, and the like. The term "reactive" means that the components of the adhesive react with each other (or self-react) either by polymerizing, crosslinking, or both, using any of the mechanisms listed above.

A preferred thermoset adhesive is a structural adhesive, particularly in the self-priming adhesive compositions. This includes those materials with high cohesive strength used to bond substrates that also have significant cohesive strength, such as wood, composites, or metal. Typically, the practical adhesive bond strength is in excess of 6.9 MPa at room temperature for a structural adhesive. Alternatively, one can define a structural adhesive as a material used to join together high strength materials and the adhesive bond made in such a fashion is resistant to creep in use. Such adhesives are usually polar in character with a high surface energy and the cured adhesive is resistant to many types of environmental attack. These adhesives include epoxies, acrylics, polyurethanes, etc.

For certain preferred embodiments, the adhesive is an epoxy adhesive. Epoxy adhesives are a broad class of adhesives in which the reactive resin is functionalized with the oxiranyl (epoxide) group. The adhesive includes one or more oxirane-functional resins, optionally includes non-reactive fillers (e.g. inorganic powders such as clay and talc), optionally includes glass beads or a fibrous mat as a thickness control method, optionally includes a rubber modifier (e.g. carboxy terminated butadiene-nitrile rubber (CTBN) such as CTBN 1300×8 from B. F. Goodrich), and also includes a curative which is reactive with the oxirane group. Curatives that react with oxirane groups are well-known to those practiced in the art of epoxy adhesives and include di- and polyamines, di- and polythiols, di- and polyphenols, di- and polyanhydrides, di- and polycarboxylic acids, imidazoles, imidazole metal complexes, as well as certain metal salts that initiate cationic polymerization, etc.

Epoxy adhesives can be broadly classed into methods by which the adhesive can be made storage stable. In one-part epoxy adhesives, the curative is chosen such that it is insoluble under storage conditions but becomes soluble under cure conditions (e.g., heat.) One such curative is dicyandiamide. Alternatively, one might choose a curative whose curing reaction is initiated by light. One such material is diphenyliodonium hexafluorophosphate. In such a formulation, the adhesive would be stable in the dark but would cure when exposed to light. Another method by which one achieves storage stability is to formulate a two-part epoxy adhesive. In this case, the oxirane functional resins are stored in separate containers from the curing agents. When cure is desired, the two components are mixed in appropriate proportions in order to initiate cure.

Similar formulations can also be described for acrylic, urethane, phenolic, polyimide, and cyanate ester adhesive chemistries as well as several other structural adhesive chemistries. See, A. V. Pocius, *Adhesion and Adhesives Technology, An Introduction*, Hansen Publishers, Ch. 8, 1997.

The adhesive can be a pressure sensitive adhesive, particularly in the low-surface-energy adhesive compositions. One well-known means of identifying pressure sensitive adhesives is the Dahlquist criterion. This criterion defines a pressure sensitive adhesive as an adhesive having a 1 second creep compliance of greater than $1 \times 10^{-6}$ cm$^2$/dyne as described in *Handbook of Pressure Sensitive Adhesive Technology*, Donatas Satas (Ed.), $2^{nd}$ Edition, p. 172, Van Nostrand Reinhold, New York, N.Y., 1989. Alternatively, since modulus is, to a first approximation, the inverse of creep compliance, pressure sensitive adhesives may be defined as adhesives having a Young's modulus of less than $1 \times 10^6$ dynes/cm$^2$. Another well known means of identifying a pressure sensitive adhesive is that it is aggressively and permanently tacky at room temperature and firmly adheres to a variety of dissimilar surfaces upon mere contact without the need of more than finger or hand pressure, and which may be removed from smooth surfaces without leaving a residue as described in *Glossary of Terms Used in the Pressure Sensitive Tape Industry* provided by the Pressure Sensitive Tape Council, August, 1985. Another definition of a suitable pressure sensitive adhesive is that it preferably has a room temperature storage modulus within the area defined by the following points as plotted on a graph of modulus versus frequency at 25° C.: a range of moduli from approximately $2 \times 10^5$ to $4 \times 10^5$ dynes/cm$^2$ at a frequency of approximately 0.1 radians/sec (0.017 Hz), and a range of moduli from approximately $2 \times 10^6$ to $8 \times 10^6$ dynes/cm$^2$ at a frequency of approximately 100 radians/sec (17 Hz) (for example see Figure 8–16 on p. 173 of *Handbook of Pressure Sensitive Adhesive Technology* (Donatas Satas, Ed.), $2^{nd}$ Edition, Van Nostrand Rheinhold, N.Y., 1989). Any of these methods can be used to identify suitable pressure sensitive adhesives for use in the methods of the present invention.

Examples of pressure sensitive adhesives useful in the present invention include tackified natural rubbers, synthetic rubbers, tackified styrene block copolymers, (meth)acrylics, poly(alpha-olefins), and silicones. For certain embodiments, the pressure sensitive adhesive is an acrylic, polyolefin (e.g. poly(alpha-olefins), styrene-butadiene block copolymer, styrene-butadiene random copolymer elastomer resin, or a tackified rubber resin.

Useful natural rubber pressure sensitive adhesives generally contain masticated natural rubber, from 25 parts to 300 parts of one or more tackifying resins to 100 parts of natural rubber, and typically from 0.5 part to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include, but are not limited to, wood rosin and its hydrogenated derivatives; terpene resins of various softening points, and petroleum-based resins. Other materials can be added to natural rubber adhesives for special purposes, wherein the additions can include plasticizers, pigments, and curing agents to partially vulcanize the pressure sensitive adhesive.

Another useful class of pressure sensitive adhesives are those that include synthetic rubber. Such adhesives are generally rubbery elastomers, which are either self-tacky or non-tacky and require tackifiers.

Self-tacky synthetic rubber pressure sensitive adhesives include, for example, butyl rubber, a copolymer of isobutylene with less than 3 percent isoprene, polyisobutylene, a homopolymer of isoprene, polybutadiene, or styrene/butadiene rubber.

Synthetic rubber pressure sensitive adhesives, which generally require tackifiers, are also generally easier to melt process. They include polybutadiene or styrene/butadiene rubber, from 10 parts to 200 parts of a tackifier, and generally from 0.5 part to 2.0 parts per 100 parts rubber of an antioxidant. An example of a synthetic rubber is that available from BF Goodrich under the trade name AMERIPOL 101 IA, a styrene/butadiene rubber. Tackifiers that are useful include derivatives of rosins, polyterpenes, $C_5$ aliphatic olefin-derived resins, and $C_9$ aromatic/aliphatic olefin-derived resins.

Styrene block copolymer pressure sensitive adhesives generally include elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as those available under the trade names KRATON D 1107P, KRATON G1657, KRATON G 1750X, and KRATON D 1118X from Shell Chemical Co. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as those available under the trade names ESCOREZ 1300 and WINGTACK from Goodyear; rosin esters, such as those available under the trade names FORAL and STAYBELITE Ester from Hercules, Inc.; hydrogenated hydrocarbons, such as those available under the trade name ESCOREZ 5000 from Exxon; polyterpenes, such as those available under the trade name PICCOLYTE A; and terpene phenolic resins derived from petroleum or terpentine sources, such as those available under the trade name PICCOFYN A100 from Hercules, Inc. Resins that associate with the thermoplastic phase tend to stiffen the pressure sensitive adhesive. (Meth)acrylic pressure sensitive adhesives generally have a glass transition temperature of about −20° C. or less and may include from 100 to 80 weight percent of a $C_4$–$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, vinyl acetate, N-vinyl pyrrolidone, and styrene macromer. Preferably, the (meth)acrylic pressure sensitive adhesives include from 0 to 20 weight percent of acrylic acid and from 100 to 80 weight percent of isooctyl acrylate. The (meth)acrylic pressure sensitive adhesives may be self-tacky or tackified. Useful tackifiers for (meth) acrylics are rosin esters such as that available under the trade name FORAL 85 from Hercules, Inc., aromatic resins such as that available under the trade name PICCOTEX LC-55WK from Hercules, Inc., aliphatic resins such as that available under the trade name PICCOTAC 95 from Hercules, Inc., and terpene resins such as that available under the trade names PICCOLYTE A-115 and ZONAREZ B-100 from Arizona Chemical Co. Other materials can be added for special purposes, including hydrogenated butyl rubber, pigments, and curing agents to vulcanize the adhesive partially.

Poly(alpha-olefin) pressure sensitive adhesives, also called poly(1-alkene) pressure sensitive adhesives, generally include either a substantially uncrosslinked polymer or an uncrosslinked polymer that may have radiation activatable functional groups grafted thereon as described in U.S. Pat. No. 5,112,882 (Babu et al.). The poly(alpha-olefin) polymer may be self tacky and/or include one or more tackifying materials.

Tackifying materials are typically resins that are miscible in the poly(alpha-olefin) polymer. The total amount of tackifying resin in the poly(alpha-olefin) polymer ranges from 0 to 150 parts by weight per 100 parts of the poly (alpha-olefin) polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a C5 olefin fraction of this type include those available under the trade name WINGTACK from Goodyear Tire and Rubber Co. Other materials can be added for special purposes, including antioxidants, fillers, pigments, and radiation activated crosslinking agents.

Silicone pressure sensitive adhesives include two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer including polydiorganosiloxane soft segments and urea terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir et al.).

Other materials can be added to the adhesive component for special purposes, including, pigments, plasticizers, and fillers. Fillers are typically used in amounts from 0 part to 10 parts per 100 parts of pressure sensitive adhesive. Examples of fillers that can be used include zinc oxide, silica, carbon black, pigments, metal powders, and calcium carbonate.

Self-priming Adhesive Compositions

Most adhesive bonds between structural adhesives and high strength, high energy surfaces (e.g. metals, glass) are susceptible to attack by moisture. The attack of moisture can be mediated by treating the substrate with an appropriate surface preparation and possibly, in addition, the application of a corrosion inhibiting primer. Surface preparations include etching of metal surfaces (e.g., hydrofluoric acid etching of nickel, acid etching of steel, chromic acid/sulfuric acid etching of aluminum) and may also include processes such as anodization of aluminum, magnesium and titanium. In addition, once the metal has been surface prepared, the thus created high-energy surface has to be protected against corrosion and a subsequent primer layer may be applied.

Many metals arrive in the bond shop in a condition that is likely to produce adhesive bonds of low strength and low durability. They are contaminated with oils. In addition, some manufacturing processes require the use of oils. For example, some metals must be "deep-drawn" in order for them to acquire their desired shape. Deep-drawing requires the use of oils in order to more easily shape the metal. The surface preparations mentioned above (e.g., acid etching) are typically preceded by an oil removal step in order to remove these contaminants. Clearly, all of the steps described above add significantly to the cost of generating an adhesive bond. In many of the possible procedures, noxious acids are used. Clearly, it would be a distinct advantage to have an adhesive system that primes the surface of the substrate by an in-situ chemistry. The adhesives of this invention provide such a means.

The adhesive component of a self-priming adhesive composition is preferably a thermoset adhesive, and more preferably a structural adhesive. They are preferably used on metal-containing (e.g., metal or metal oxide) substrates. More preferably, the adhesive is a two-part epoxy adhesive, which can be provided where one reactive part is combined with the precursor to the self-assembled film and the other reactive part is separate until they are to react.

For enhancing adhesion of an adhesive component to a substrate, such as a metal surface or oily metal surface, the self-assembled film precursor is preferably selected from the group of compounds having the structure Y—Z—(CQ$_2$)$_n$—W—X wherein Y is a functional group capable of interacting with the adhesive component, or an organic group optionally including at least one functional group capable of interacting with the adhesive component, and Q is H. More preferably, Y is a group that chemically interacts (i.e., forming covalent or ionic bonds) with the adhesive component. Examples of such Y groups include an amino group (—NH$_2$), a (meth) acryloyl group

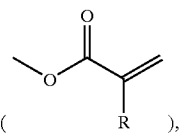

a (meth)acrylamido group

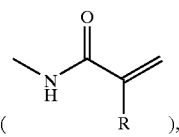

a hydroxyl group (—OH), an oxiranyl group

a vinyl group (—CH=CH$_2$), a thiol group (—SH), an aziridinyl group

or a thiiranyl group

wherein R can be H or methyl. The Y group is preferably chosen such the primary resin in the adhesive component.

Preferably, Z, W, and X are as defined above generally for the self-assembled film precursor. For certain preferred embodiments for enhancing adhesion of an adhesive component to a substrate, Z and W are each independently covalent bonds. Preferably, X is a group that enhances adhesion to a metal-containing substrate, particularly one that is contaminated with oil (typically, having up to about 0.4 mg/cm$^2$ of a hydrocarbon oil or up to about 0.6 mg/cm$^2$ of an emulsion oil). For certain particularly preferred embodiments for enhancing adhesion of an adhesive component to a substrate, Y is OH, W and Z are covalent bonds, X is a hydroxamic acid or carboxylic acid and Q is H.

The self-assembled film precursor is present in the adhesive composition in an amount that provides a desired result. For example, the precursor is present in an epoxide adhesive composition in an amount of about 0.05 millimole to about 0.25 millimole per one equivalent epoxide weight. While not wishing to be bound by any theory, it is apparent that the optimum concentration, which can be determined by one of skill in the art without undue experimentation, is related to "n", the length of the central portion of the precursor.

Adhesive Compositions for Delivery of Low-surface-energy Films

The adhesive component of a composition that delivers a low-surface-energy film is preferably a pressure sensitive adhesive. Preferably, the pressure sensitive adhesive is an acrylic, polyolefin (e.g., poly(alpha-olefin)), styrene-butadiene block copolymer, styrene-butadiene random co-polymer elastomer resin, or a tackified rubber resin.

For delivering a low-surface-energy protective film to a substrate, the self-assembled film precursor is preferably of the structure Y—Z—(CQ$_2$)$_n$—W—X wherein: Y is H, F or a perfluoroalkyl group of the formula C$_m$F$_{2m+1}$ where m is no greater than about 10; Z is a covalent bond; Q is H or F; W is a covalent bond or an organic linking group; X is a nonionic group that interacts with a substrate on which the adhesive composition is disposed; and n is at least about 7; with the proviso that (CQ$_2$)$_n$ does not include CHF groups or alternating CH$_2$CF$_2$ groups; and wherein at least about 0.1% by weight of the precursor in neutral water at 22° C. forms a multiphase composition. For certain particularly preferred embodiments, Y is F, Z is a covalent bond, and Q is F.

For delivering a low-surface-energy protective film to a substrate, the self-assembled film precursor is more preferably selected from the group of alkyl- or fluorinated alkyl-substituted thiols, silanes, phosphonic acids, monophosphate esters, and benzotriazoles. Specific examples include 1-octadecylthiol, 1-octadecylphosphonic acid, octadecyltrichlorosilane, C$_8$F$_{17}$(CH$_2$)$_{11}$SH, C$_7$F$_{15}$CH$_2$OCH$_2$CH$_2$CH$_2$SiCl$_3$, C$_8$F$_{17}$CH$_2$CH$_2$SiCl$_3$, and C$_8$F$_{17}$CH$_2$CH$_2$OPO(OH)$_2$.

For treatment of glass or silicon oxides, preferably, the adhesives are modified with compounds that include silyl groups, such as those of the formula —SiR$_3$, wherein each R group is independently selected from the group of —OCH$_3$, —OCH$_2$CH$_3$, acetoxy, and Cl. Other preferred embodiments include adhesives modified with alkylthiols for treatment of gold substrates, alkyl or fluorinated alkyl monophosphates or phosphonic acids for treatment of aluminum or copper substrates, and alkyl or fluorinated alkyl benzotriazoles for treatment of copper substrates.

The precursor is present in the adhesive at a level that achieves the desired result, and must be established by experimentation for each particular system. Typically, the self-assembling film precursor is added to the adhesive at levels of about 2 weight percent (wt %) or less, preferably, about 1 wt % or less, and more preferably, about 0.1 wt % to about 1 wt %. Too little gives poor films, while too much can alter bulk properties of the adhesive.

In one embodiment, a fluorinated silane is added to a solution of the adhesive in an organic solvent such as heptane. The adhesive and solvent are typically chosen so as to be chemically unreactive toward the silane. Trichlorosilanes are preferred to other derivatives such as trialkoxysilanes because they are more reactive in the self-assembly process. However, the solution typically is used as soon as possible after mixing, to prevent the silane from scavenging adventitious moisture and forming less surface active oligomeric species by hydrolysis and condensation. Thus, the activity of the silane-modified adhesive solution toward formation of self-assembled films will drop as the solution ages. The composition is then coated on a substrate of interest, such as antireflective glass, and a polymeric film laminated to the adhesive composition. The construction can then be oven treated or stored at room temperature to allow the self assembly to occur. Typically, this occurs by diffusion of the silane to the interface of the adhesive composition and the antireflective glass, where it reacts with adsorbed water. After an appropriate dwell time, removal of the plastic film and adhesive component exposes the fluorinated siloxane-treated surface.

The use of a pressure sensitive adhesive to deliver a self-assembled film of monomolecular thickness is advantageous compared to conventional methods of delivering low-surface-energy self-assembled protective films, such as solution dip coating methods, for a number of reasons. For example, use of the compositions of the present invention can allow for much faster processing because the adhesive composition can be coated and laminated on a much shorter time scale than a dip coating, which may require on the order of minutes per part. The surface functionalization then occurs while the laminated construction is stored. Also, provided that the adhesive can be left in contact with the surface to be treated, cleanup of parts after dip coating is no longer a concern. The end user can do any required final cleaning of the surface after removal of the adhesive and laminating film when the part is put into use because the resulting self-assembled film allows for easy removal of any remaining adhesive residues. Also, during transport and storage the laminating film can provide additional protection to the surface, particularly a delicate one such as a mirrored or antireflective surface. Furthermore, the self-assembled film can be applied to specific regions of a surface using the adhesive compositions of the present invention more easily than occurs with dip coating or vapor-phase processing.

Objects and advantages of this invention are further illustrated by the following examples, but the particular materials and amounts thereof recited in these examples, as well as other conditions and details, should not be construed to unduly limit this invention.

EXAMPLES

Lap Shear Strength Test

Lap shear strengths were determined following the ASTM Standard Method of Test for STRENGTH PROPERTIES OF ADHESIVES IN SHEAR BY TENSION LOADING (METAL-TO-METAL) Designation D1002-72 with the following modification:
(1) Substrates were Alcoa 6111 aluminum alloy sheet 0.0762 cm or 0.1524 cm thick×2.54 cm wide×10.16 cm long. The bonds were made in the so-called "finger specimen" in which one substrate was lapped with another creating a 3.22 cm$^2$ contact area.
(2) Before bonding, substrates were cleaned by solvent wiping with acetone (some substrates were left in this condition).
(3) Oil was then deposited on some of the substrate surfaces by dispensing an appropriate amount of the oil to achieve a given coating weight and then manually smearing the oil to cover the entire coupon surface. Substrates were allowed to sit overnight to let the oil flow and level into a layer of uniform thickness. Two types of oils were employed: a hydrocarbon oil Quaker Q61A-US (coating weight 0.4 mg/cm$^2$), and an emulsion oil Fuchs DB4265 (coating weight 0.6 mg/cm$^2$).
(4) Lap panels were prepared according to the ASTM standard using adhesive compositions described below (with and without a precursor to an in-situ self-assembled film) using glass bead spacers to achieve a bond line thickness of approximately 0.015 to 0.020 cm.
(5) The adhesive specimens were cured at elevated temperatures specified below for one hour followed 24 hours aging at room temperature.
(6) Lap shear data is reported as an average of three samples.

MATERIALS

Self-assembled Film Precursors

10-Undecenoyl hydroxamic acid is a starting material for the synthesis of HA-1 and HA-2 precursors described below. A mixture of 10-undecenoyl chloride (70.96 g, 0.35 moles, available from Aldrich Chemical Co.), hydroxylamine hydrochloride (25.71 g, 0.37 moles, available from Aldrich Chemical Co.), pyridine (47.5 g, 0.6 moles), and dry tetrahydrofuran (enough to solvate all components, about 50 ml) was stirred for one hour at room temperature followed by refluxing for another hour. The reaction mixture was concentrated, the residue dissolved in ethyl acetate (400 ml) and the solution extracted with 0.25 M KHSO$_4$ (2×100 ml), saturated NaHCO$_3$ (1×100 ml) and saturated NaCl (1×100 ml). The ethyl acetate solution was washed with water and dried over Na$_2$SO$_4$. The ethyl acetate was removed under vacuum on a rotary evaporator and the residue was dissolved in a 1:1 solution of dichloromethane and hexane. Ammonia was bubbled through the solution to precipitate traces of the free acid as the ammonium salt. The solution was filtered to remove the acid salt precipitate and the solvent removed on a rotary evaporator to produce the 10-undecenoyl hydroxamic acid.

HA-1 (11-[(1,2-dihydroxyethyl)sulfanyl]-N-hydroxyundecanamide) was synthesized by the following procedure. A solution of 10-undecenoyl hydroxamic acid (15 grams (g), 0.075 mole), 1-thioglycerol (8.1 g, 0.0748 mole, available from Aldrich Chemical Company) and ESACURE KB-1 (2,2-dimethoxy-1,2-diphenylethanone, (0.06 g, a photo initiator available from Sartomer Co., Exton, Pa.) in methyl ethyl ketone (about 35 milliliters (ml)) was exposed to UV light (fluorescent black light with emission between 300 nanometers (nm) and 400 nm with maximum emission at 351 nm) at a distance of about 10 centimeters (cm) for 1 hour (hr). The reaction mixture was filtered to obtain a quantitative yield of 11-[(1,2-dihydroxyethyl)sulfanyl]-N-hydroxyundecanamide. The isolated solid was dissolved in ethyl acetate (about 25 ml). The solution was placed in a refrigerator and allowed to precipitate. The precipitate was filtered from the solution and was washed with cooled (<0° C.) ethyl acetate. This product, which was characterized by NMR, was used without any further purification.

HA-2 (N-hydroxy-11-[2-hydroxyethyl)sulfanyl] undecanamide) was prepared by a procedure substantially the same as that used to prepare HA-1 except that 2-mercaptoethanol (5.84 g, 0.0748 mole, available from Aldrich Chemical Co., Milwaukee, Wis.) was used in place of 1-thioglycerol.

HA-3 (N-Hydroxy-heptadecanamide) is commercially available from Aldrich Chemical Co.

HA-4 (2-[2-(hydroxyamino)-2-oxoethyl]heptadecanoic acid) was prepared as follows. Hydroxylamine hydrochloride (18.07 g, 0.26 moles) was dissolved in pyridine (18.49 g, 0.26 moles) by stirring the mixture for one-half hour at 26° C. n-Hexadecyl succinic anhydride (88.14 g, 0.27 moles, available from Tokyo Kasei Kogyo Co. Ltd., Tokyo, Japan) was added to the solution followed by the addition of acetonitrile (about 50 ml). The resulting mixture was refluxed for two hours, cooled, and the solvent removed under reduced pressure using a rotary evaporator. Hydrochloric acid (10%) in water (100 ml) was added to the resulting residue and the mixture filtered to recover the suspended solids. The filtrate was dispersed in water to dissolve the pyridinium hydrochloride by-product of the reaction and the dispersion filtered and the solid retained. The process of washing with water and filtering was repeated several times, yielding 2-[2-(hydroxyamino)-2-oxoethyl]heptadecanoic acid as a solid.

12-HDDA

12-Hydroxydodecanoic acid, commercially available from Aldrich Chemical Co.

16-HHDA

16-Hydroxyhexadecanoic acid, commercially available from Aldrich Chemical Co.

GA (Glycolic acid)

Glycolic acid, commercially available from Aldrich Chemical Co.

Fluorochemical Trichlorosilane

C$_7$F$_{15}$CH$_2$OCH$_2$CH$_2$CH$_2$SiCl$_3$ was prepared as described in Example 1 of U.S. Pat. No. 5,274,159 (Pellerite et al.).

Fluorochemical Benzotriazole 1H,1H,2H,2H-perfluorodecyl benzotriazole-5-carboxylate was prepared by reaction of C$_8$F$_{17}$CH$_2$CH$_2$OH with benzotriazole-5-carboxylic acid as described in Examples 1 and 2 of International Pat. App. No. WO 99 37626 (Korba et al.).

Fluorochemical Monophosphate $C_8F_{17}CH_2CH_2OPO(OH)_2$ may be prepared by reaction of $C8F_{17}CH_2CH_2OH$ with polyphosphoric acid or $POCl_3$ as described in, for instance, U.S. Pat. Nos. 4,145,382 (Hayashi et al.) and 5,685,880 (Matsutani et al.).

Fluorochemical Thiol $C_8F_{17}(CH_2)_{11}SH$ was prepared as described in M.-W. Tsao et al, Langmuir, 13, 4317 (1997).

Octadecylthiol

Commercially available from Aldrich Chemical Co., and used without further purification.

Adhesives

Two Part Epoxy Adhesives

Two epoxy-based 2-part adhesives, Epoxy Adhesive A and Epoxy Adhesive B, the base formulations which are shown in Table 1, were prepared to evaluate the effect of the Precursors.

TABLE 1

Formulation of Two Part Epoxy Adhesives

|  | Epoxy Adhesive A Amount (gms) | Epoxy Adhesive B Amount (gms) |
| --- | --- | --- |
| Part 1 (Resin) | | |
| EPON 828[1] | 85 | 85 |
| EPON 58006[2] | 25 | 25 |
| EXL-2691[3] | 10 | 10 |
| TS-720[4] | — | 8 |
| Precursor[5] | 0.8–4.2 | 0.8–4.2 |
| Total | 121–124 | 129–132 |
| Part 2 (Curative) | | |
| CARDOLITE 541[6] | 115 | — |
| H-221[7] | — | 26.5 |
| K54[8] | 23 | 23 |

[1]An epoxy resin based upon the diglycidyl ether of bis-phenol A, commercially available from Shell Oil Co., Houston, TX.
[2]An adduct of a diglycidyl ether of bis-phenol A with carboxy terminated butadiene nitrile reactive liquid polymer available under the trade designation HYCAR 1300X8 from Shell Oil Co.
[3]A methacrylate-butadiene-styrene-based core shell polymer obtained from Rohm & Haas Co., Philadelphia, PA.
[4]A fumed silica obtained from Cabot Corp., Boston, MA.
[5]Precursor as indicated in formulations listed in Tables 3, 4, 5, 6, 8, and 9 following.
[6]A phenalkamine curing agent commercially available from Cardolite Co., Newark, NJ.
[7]A di-primary amine curing agent commercially available from Dixie Chemical Co., Inc., Houston, TX.
[8]A tertiary amine epoxy catalyst commercially available from Air Products and Chemicals, Allentown, PA.

The two part epoxy adhesives were formulated by adding the components to either a 3-neck glass flask or a beaker and stirring until a homogeneous resin mixture was obtained. The precursor was added to the resin mixture at temperatures of about 80° C. to 100° C. The individual parts of the two component epoxy adhesive compositions were kept separate until the adhesive bonds were prepared.

The mix ratio of Epoxy Adhesive A (the amount of resin to the amount of curative) was approximately 122 parts resin to 138 parts curative by weight and the mix ratio of Epoxy Adhesive B was approximately 131 parts of resin to 49.5 parts of curative by weight. Both adhesives vitrified in about 4 hours and cured completely in about 24 hours at room temperature.

Adhesive A

Rubber Cement, 12% solids in heptane, obtained from Sanford Corporation, Bellwood, Ill.

Adhesive B

Poly-1-hexene with intrinsic viscosity 1.7 dl/g was prepared according to the method used in Example 11 of U.S. Pat. No. 5,644,007 (Davidson et al.). The polymer was diluted to 20 wt % in toluene, giving a clear, viscous solution.

Adhesive C

Butyl acrylate (148.0 g, available from BASF Corp., Mount Olive, N.J.), acrylic acid (12.0 g, available from BASF Corp.), 2-butanone (240.0 g), and 2,2'-azobis(2-methylbutanenitrilc) (0.24 gm, available from E. I. DuPont DeNemours Co., Wilmington, DE under the trade designation VAZO 67), were charged to a one-liter glass bottle. The contents were deoxygenated by purging with nitrogen at a flow rate of one liter per minute for two minutes. The bottle was sealed and placed in a rotating water bath at 55° C. for 24 hr to effect essentially complete polymerization of the monomers. Measured percent solids was 37.3 wt %. Inherent viscosity in ethyl acetate at 0.15 g/dl concentration was 0.609 dl/g.

Example 1

A two part epoxy adhesive composition having the base formulation of Epoxy Adhesive A above was prepared that contained HA-1 (30 mg in 5 grams of mixed Epoxy Adhesive A) as the precursor. Lap shear specimens were prepared as described in the Lap Shear test method and the specimens extended to failure using a Sintech tensile tester (available from MTS Systems Corp., Eden Prairie, Minn.) at a rate of 0.254 centimeter per minute (cm/min). Lap shear data for the precursor containing sample and a control adhesive sample having the same composition except for the Precursor are reported in Table 2.

TABLE 2

Lap Shear Performance (MPa) of Epoxy Adhesive A
With and Without HA-1 On Oily and Bare Al 6111

| | Lap Shear Strength (MPa) | | |
| --- | --- | --- | --- |
| Precursor | Bare Surface | Q61A-US Hydrocarbon Oil | DB4265 Emulsion Oil |
| Control, no Precursor | 5.2 ± 0.31 | 4.0 ± 0.21 | 1.3 ± 0.13 |
| HA-1 | 12.1 ± 0.95 | 11.4 ± 0.95 | 10.7 ± 0.68 |

Precursor HA-1, present at only approximately 0.5% by weight, substantially increased the initial lap shear strength to bare aluminum as well as to oil covered samples of the same aluminum, with the largest change (approximately 10x) observed in the case of the emulsion oil. In the case of the hydrocarbon oil, shear performance increased approximately 3x, while for the bare surface, shear strength doubled when using the model adhesive with the precursor HA-1. An examination of the specimens indicated that all failures were adhesion failure of the adhesive to the metal. These results indicate the ability of the adhesives of this invention to act as "self-priming" adhesives, subverting a coating of oil on the surface of the metal and significantly increasing initial practical adhesive bond strength.

Example 2

A series of six two part epoxy adhesive compositions having the base formulation of Epoxy Adhesive A above were prepared as described above, each composition containing the precursor at the concentration level indicated in Table 3. Lap shear specimens were prepared as described in the Lap Shear Test Method using the six adhesive compositions on aluminum, cold rolled steel and galvanized steel metal surfaces as indicated in Table 3. The control adhesive composition was the base composition for Epoxy Adhesive A without a precursor.

Example 4

A series of adhesive compositions using the Epoxy Adhesive A base composition were prepared that incorporated various precursors over a range of concentrations as indicated in Table 5. Lap shear specimens were prepared using an oiled aluminum substrate (Al 6111 oiled with 0.4 mg/cm$^2$ of Q61) and tested as described in the Lap Shear Test Method above, the results of which are reported in Table 5.

TABLE 3

Lap Shear strength (MPa) of Epoxy Adhesive A Containing Various Precursors

| Additive | Metal Oil Amount (mg)$^3$ | Al 6111 | | Cold Rolled Steel | | G60 Galvanized Steel | |
|---|---|---|---|---|---|---|---|
| | | Q61A Oil | DB4265 Oil | Q61A Oil | DB4265 Oil | Q61A Oil | DB4265 Oil |
| None | N/A$^1$ | 4.0 ± 0.21 | 1.3 ± 0.13 | 8.6 ± 0.46 | 6.1 ± 0.99 | 8.4 ± 0.29 | 7.0 ± 0.89 |
| GA | 38 | 10.4 ± 0.35 | 9.7 ± 0.46 | ND$^2$ | ND | ND | ND |
| 12HDDA | 64.9 | 10.6 ± 0.11 | 11.2 ± 0.33 | ND | ND | ND | ND |
| 16HDDA | 19.1 | 11.6 ± 0.74 | 11.4 ± 1.04 | ND | ND | ND | ND |
| HA-1 | 32.1 | 11.4 ± 0.96 | 10.7 ± 0.68 | 11.8 ± 0.72 | 10.3 ± 0.82 | 11.9 ± 0.21 | 10.5 ± 0.42 |
| HA-2 | 30.3 | 11.3 ± 0.64 | 9.3 ± 0.75 | 12.5 ± 0.45 | 8.1 ± 0.94 | ND | ND |
| HA-3 | 31.4 | 4.8 ± 0.71 | 5.7 ± 0.56 | 8.4 ± 1.04 | 3.5 ± 2.05 | ND | ND |

$^1$N/A= not applicable
$^2$ND= not determined
$^3$per 5 grams of mixed Epoxy Adhesive A The data in Table 3 demonstrates several aspects of the present invention. First, even with glycolic acid, the shortest chain bifunctional material studied, there is an improvement in lap shear strength. Second, precursors without a tail functionality (Y) show poorer performance (contrast HA-3 versus HA-1 or HA-2) than their bifunctional analogs. Third, addition of a precursor to Epoxy Adhesive A provides improved initial adhesion to a variety of oily metals.

Example 3

Samples of Epoxy Adhesives A and B (as described above) were prepared with Precursor HA-1 at the concentration levels indicated in Table 4. Samples of the two Epoxy Adhesive compositions without a Precursor were also prepared as control samples. Lap shear specimens were prepared with the adhesive compositions and tested as described in the Lap Shear Test procedure above, the results of which are reported in Table 4.

TABLE 4

Comparison of Initial Lap Shear Strength (MPa) of Epoxy Adhesives A and B With and without HA-1 on Bare and Oily Metals

| Adhesive | Metal Oil Amt HA-1 (mg)$^1$ | Al 6111 | | | G60 Galvanized Steel | | |
|---|---|---|---|---|---|---|---|
| | | None | Q61A Oil | DB4265 Oil | None | Q61A Oil | DB4265 Oil |
| Epoxy A | 0 | 6.6 ± 0.63 | 7.8 ± 0.74 | 4.2 ± 0.54 | 8.5 ± 0.49 | 8.4 ± 0.61 | 7.0 ± 0.43 |
| Epoxy A | 32.1 | 11.2 ± 0.41 | 11.4 ± 0.48 | 10.7 ± 0.68 | 11.8 ± 0.65 | 11.9 ± 0.21 | 10.5 ± 0.42 |
| Epoxy B | 0 | 4.0 ± 0.43 | 6.6 ± 0.48 | 2.4 ± 0.63 | 14.2 ± 0.48 | 6.6 ± 0.36 | 8.6 ± 0.57 |
| Epoxy B | 32.1 | 7.8 ± 0.77 | 11.0 ± 0.65 | 5.3 ± 0.92 | 14.7 ± 0.54 | 12.6 ± 0.22 | 7.9 ± 0.76 |

$^1$per 5 grams of mixed epoxy adhesive

The data in Table 4 show that the improvement in initial lap shear strength can be realized, even when a major change is made in the formulation of the epoxy adhesive.

TABLE 5

Initial Lap Shear Strength (MPa) on Oiled Aluminum as a Function of Type and Concentration of Precursor

| Amt of GA (mg)[1] | Lap Shear Strength (MPa) | Amt of 12HDDA (mg)[1] | Lap Shear Strength (MPa) | Amt of 16HDDA (mg)[1] | Lap Shear Strength (MPa) | Amt of HA-1 (mg)[1] | Lap Shear Strength (MPa) | Amt of HA-3 (mg)[1] | Lap Shear Strength (MPa) |
|---|---|---|---|---|---|---|---|---|---|
| 0 | 4.0 ± 0.21 | 0 | 4.0 ± 0.21 | 0 | 4.0 ± 0.21 | 0 | 4.0 ± 0.21 | 0 | 4.0 ± 0.21 |
| 5.3 | 7.0 ± 0.38 | 17.3 | 7.6 ± 1.33 | 19.1 | 11.6 ± 0.74 | 14.6 | 9.0 ± 0.99 | 14.3 | 4.7 ± 0.18 |
| 18.2 | 8.8 ± 0.66 | 64.9 | 10.6 ± 0.11 | 41 | 7.0 ± 0.32 | 23.4 | 11.2 ± 0.49 | 22.9 | 4.8 ± 0.60 |
| 38 | 10.4 ± 0.35 | 136.3 | 7.2 ± 0.79 | — | — | 32.1 | 11.4 ± 0.54 | 31.4 | 4.6 ± 0.22 |
| 76 | 9.4 ± 0.61 | — | — | — | — | 46.8 | 11.2 ± 0.53 | 45.9 | 4.3 ± 0.22 |
| — | — | — | — | — | — | 61.4 | 7.4 ± 0.48 | 60.2 | 4.8 ± 0.71 |
| — | — | — | — | — | — | 76 | 6.1 ± 0.43 | 74.5 | 4.2 ± 0.88 |

[1]per 5 grams of mixed Epoxy Adhesive A

The data in this Table demonstrates that there is a relationship between the optimum performance obtainable with a precursor and its concentration in Epoxy Adhesive A. A correlation between "n" in the formula for the precursor and the optimum concentration appears to exist, with longer chains having optimum concentrations at lower concentrations. At high concentrations, precursors having high values of "n" in the formula for the precursor are not soluble in Epoxy Adhesive A. Note also that a precursor not having a reactive Y function shows no optimum and no detectable performance improvement.

Example 5

Samples of Epoxy Adhesive A (as described above in Table 1) were prepared with Precursor HA- I at the concentration levels indicated in Table 6. Lap shear specimens were prepared with the adhesive compositions and tested as described in the Lap Shear Test procedure above, using solvent cleaned and oiled steel, the results of which are reported in Table 6.

TABLE 6

Initial Lap Shear Strength (MPa) on Clean and Oiled G60 Galvanized Steel as a Function of Type and Concentration of Precursor

| Ha-1 Conc. (mg)[1] | Solvent Cleaned Steel | Q61A Coated Steel | DB4265 Coated Steel |
|---|---|---|---|
| 0 | 8.4 ± 0.29 | 7.0 ± 0.89 | 5.6 ± 0.48 |
| 14.6 | 7.7 ± 0.36 | 7.3 ± 0.76 | 5.9 ± 1.38 |
| 23.4 | 8.1 ± 0.21 | 8.6 ± 2.72 | 8.5 ± 0.61 |
| 32.14 | 11.9 ± 0.21 | 10.3 ± 0.42 | 11.8 ± 0.65 |
| 46.8 | 11.2 ± 0.28 | 10.5 ± 0.41 | 11.0 ± 0.23 |
| 61.7 | 9.1 ± 0.07 | 8.2 ± 0.21 | 9.3 ± 0.36 |

[1]per 5 grams of mixed Epoxy Adhesive A

Example 6

Samples of Epoxy Adhesive A were prepared as described above with and whitout 32 mg of HA-1 (per 5 grams of mixed Epoxy Adhesive A). Lap shear e using Al 6111 coupons that had been oiled with 0.4 mg/cm$^2$ of Q61 were prepared and immediately placed in ovens that had been preset to various temperatures as indicated in Table 7. The adhesive was allowed to cure for one hour at the pre-set temperature, after which lap shear strengths, which are reported in Table 7, were determined at room temperature.

TABLE 7

Lap Shear Strength (MPa) of Adhesive Bonds on Oiled Al 6111 As a Function of Cure Temperature

| Cure Temperature (° C.) | Lap Shear Strength With HA-1 | Lap Shear Strength Without HA-1 |
|---|---|---|
| 80 | 11.8 ± 0.46 | 8.1 ± 1.83 |
| 100 | 12.6 ± 0.62 | 8.9 ± 0.28 |
| 120 | 11.5 ± 1.19 | 4.7 ± 1.18 |
| 140 | 7.6 ± 0.34 | 1.8 ± 0.28 |
| 160 | 1.0 ± 0.25 | 1.4 ± 0.11 |
| 180 | 1.9 ± 0.07 | 1.3 ± 0.17 |

The data in Table 7 demonstrates that the addition of HA-1 to adhesive A provides a larger processing window in that significant lap shear strength is attainable over a larger range of cure temperatures. This indicates that the improved bond strength is likely an improvement in wetting of the substrate by the adhesive with the precursor present.

Example 7

Four two part epoxy adhesive compositions having the base formulation of Epoxy Adhesive A above were prepared as described above, each composition containing the precursor at the concentration level indicated in Tables 8 and 9. Lap shear specimens were prepared as described in the Lap Shear Test Method using the four adhesive compositions on aluminum and galvanized steel metal surfaces as indicated in Tables 8 and 9. The control adhesive composition was the base composition for Epoxy Adhesive A without a precursor.

Half of the lap shear specimens were tested for their initial shear strength and half were placed in a salt spray chamber maintained according to the procedures described in ASTM Standard B 117. Lap shear data for the various samples are reported in Tables 8 and 9.

TABLE 8

Lap Shear Strength (MPa), Initial and After Exposure to 1,000 Hours Salt Spray, on Solvent Wiped and Oiled Al 6111 Metal

| | | Bare Metal | | Oiled with Q61A | | Oiled with DB4265 | |
|---|---|---|---|---|---|---|---|
| Precursor | Amt. (mg)[1] | Initial | After 1000 Hrs. Salt Spray Exposure | Initial | After 1000 Hrs. Salt Spray Exposure | Initial | After 1000 Hrs. Salt Spray Exposure |
| None | N/A | 8.8 ± 0.97 | 3.4 ± 0.90 | 8.9 ± 0.28 | 3.7 ± 0.46 | 9.2 ± 0.69 | 4.2 ± 1.45 |
| HA-1 | 32.1 | 11.5 ± 1.43 | 11.6 ± 0.98 | 12.1 ± 1.05 | 10.9 ± 1.22 | 10.7 ± 0.68 | 9.54 ± 0.43 |
| 12HDDA | 64.9 | 10.1 ± 0.65 | 8.5 ± 1.68 | 10.6 ± 0.11 | 8.5 ± 1.43 | 11.2 ± 0.33 | 9.14 ± 1.65 |
| GA | 38 | 8.7 ± 1.16 | 4.2 ± 1.32 | 10.4 ± 0.35 | 6.1 ± 1.36 | 9.7 ± 0.57 | 6.3 ± 1.08 |
| HA-3 | 31.4 | 3.3 ± 0.65 | 2.0 ± 0.67 | 4.8 ± 0.59 | 2.4 ± 0.63 | 5.3 ± 0.34 | 3.6 ± 1.39 |

[1]per 5 grams of mixed Epoxy Adhesive A

TABLE 9

Lap Shear Strength (MPa), Initial and After Exposure to 1,000 Hours Salt Spray, on Solvent Wiped and Oiled G60 Metal

| | | Bare Metal | | Oiled with Q61A | | Oiled with DB4265 | |
|---|---|---|---|---|---|---|---|
| Precursor | Amt. (mg)[1] | Initial | After 500 Hrs. Salt Spray Exposure | Initial | After 500 Hrs. Salt Spray Exposure | Initial | After 500 Hrs. Salt Spray Exposure |
| None | N/A | 9.9 ± 0.29 | 5.6 ± 1.16 | 8.4 ± 0.29 | 3.7 ± 0.42 | 7.0 ± 0.89 | 3.8 ± 0.26 |
| HA-1 | 45 | 11.8 ± 0.84 | 10.4 ± 0.71 | 11.9 ± 0.21 | 10.0 ± 0.65 | 10.5 ± 0.42 | 9.2 ± 0.77 |
| 12HDDA | 64.9 | 10.9 ± 0.66 | 7.8 ± 0.77 | 10.7 ± 1.54 | 8.1 ± 1.30 | 9.3 ± 1.21 | 6.4 ± 0.99 |
| GA | 38 | 8.6 ± 4.62 | 4.6 ± 0.84 | 10.4 ± 1.88 | 4.4 ± 0.47 | 9.67 ± 1.08 | 3.0 ± 0.39 |
| HA-3 | 45 | 8.6 ± 0.61 | 6.0 ± 0.55 | 7.9 ± 0.47 | 7.3 ± 0.59 | 8.1 ± 1.01 | 4.9 ± 0.34 |

[1]per 5 grams of mixed Epoxy Adhesive A

The data in Tables 8 and 9 show that precursors containing a reactive Y group both significantly increase initial bond strength over adhesives not containing a precursor and also significantly improve bond durability. Bond strength retention as high as 100% was noted for adhesives containing HA-1 while adhesives not containing a precursor or an ineffective precursor retained as little as 39% of the initial bond strength. The data in Tables 8 and 9 also demonstrate that chain length of the precursor is an important factor. Addition of a short chain length precursor (GA) improved the initial bond strength but did not retain that strength on exposure to salt spray challenge. By comparison, the addition of a longer chain length precursor (HA-1 or 12HDDA) showed both and improved initial bond strength and retention of that bond strength on exposure to a salt spray challenge.

Example 8

The durability of metal coatings made with Adhesive A was tested by a series of Electrochemical Impedance Spectroscopy (EIS) measurements. Adhesive compositions of the present invention were applied to Al 6111 test coupons as a coating and the coupons subjected to electrical impedance measurements as described in the ASTM Standard Practice for VERIFICATION OF ALGORITHM AND EQUIPMENT FOR ELECTROCHEMICAL IMPEDANCE MEASUREMENT Designation G106-89, and the ASTM Standard Practice for CONVERSIONS APPLICABLE TO ELECTROCHEMICAL MEASUREMENTS IN CORROSION TESTING Designation G3-89. An explanation of the interpretation of this type of data can be found in "Electrochemical Impedance: Analysis and Interpretation," (J. R. Scully, D. C. Silverman and M. Kendig, Eds), ASTM Publications, 484 pp (1993). In these measurements, a 9.3-cm×24.8-cm panel of Al 6111 was cleaned by a solvent wipe, coated with the test adhesive using a Meyer bar (#20), and the adhesive cured for 1 hour at 80° C.

Two samples of Epoxy Adhesive A were prepared as described above, one containing a long chain precursor (30 mg of 16HHDA per 5 grams of mixed Epoxy Adhesive A) and the other containing a short chain length precursor (30 mg of GA per 5 grams of mixed Epoxy Adhesive A). Epoxy adhesive A without a precursor was used as a control for this study. The coated panels were mounted in an electrochemical flat cell exposing only the coated surface to a 0.5 M NaCl electrolyte. The coating was left intact (i.e., no holes were purposely created) and the exposed surface area was exactly 1 cm$^2$.

Figure 4:
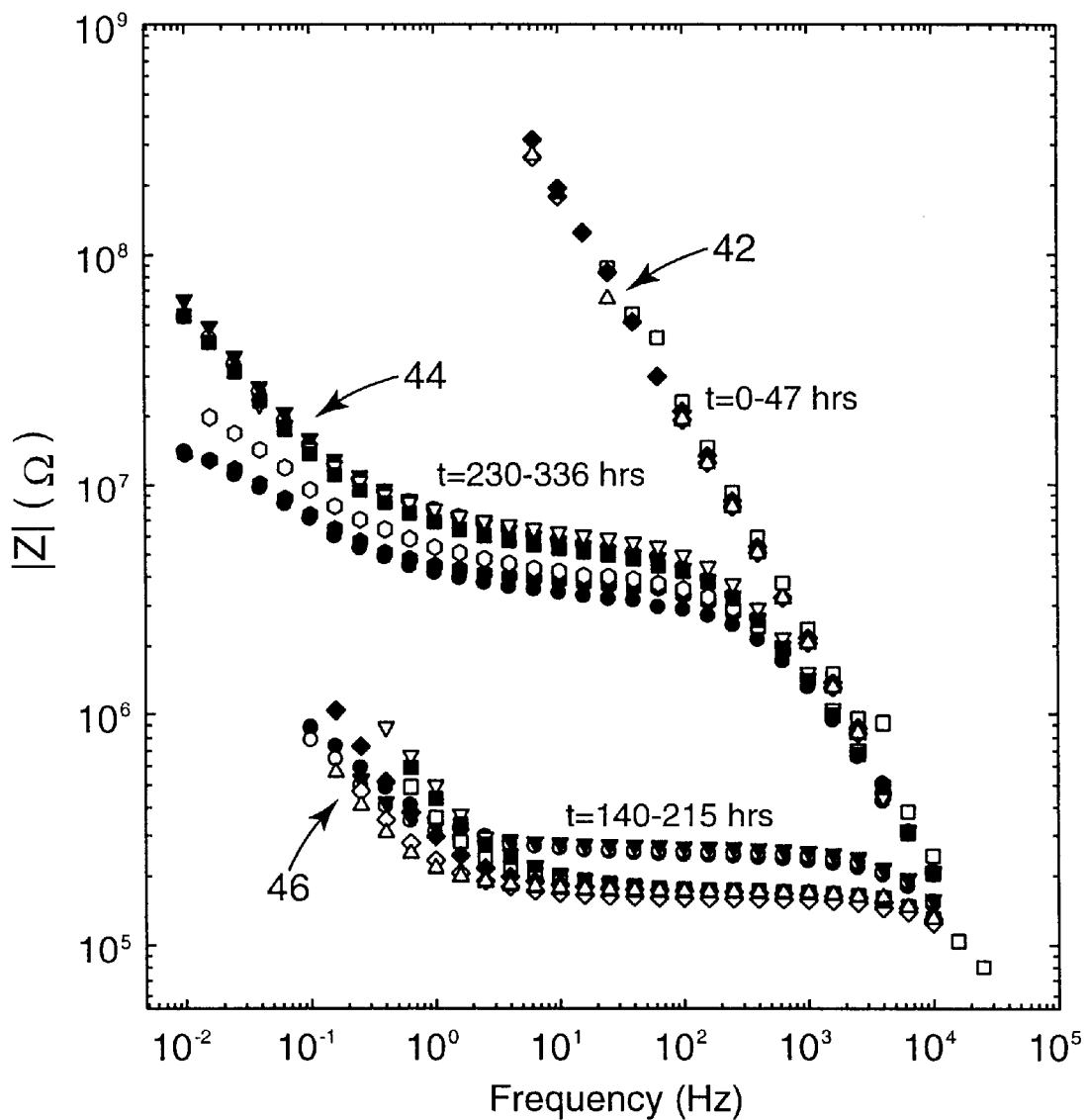
FIG. 4 is a graph of Electrochemical Impedance Spectroscopy (EIS) measurements for an aluminum panel coated with an epoxy adhesive.

FIG. 4 shows a summary of the EIS measurements made for an Al 6111 panel coated with Epoxy Adhesive A (with no precursor). The modulus of the impedance ($|Z|$) is plotted on a log-log scale versus the frequency of the applied AC potential (20 mV peak-to-peak). The time labels (t) refer to the time of exposure to the corrosion solution. Straight lines, such as family of curves 42 (time=0–47 hours), indicates a capacitative impedance situation wherein the coating had not been breached by salt water. Sigmoid-shaped lines, such as families of curves 44 (time=230–336 hours) and 46 (time=140–215 hours), indicate a conductive component has been added to the circuit as a result of salt water breaching the coating. It is obvious that after 140 hours, salt water had breached the coating.

Figure 5:
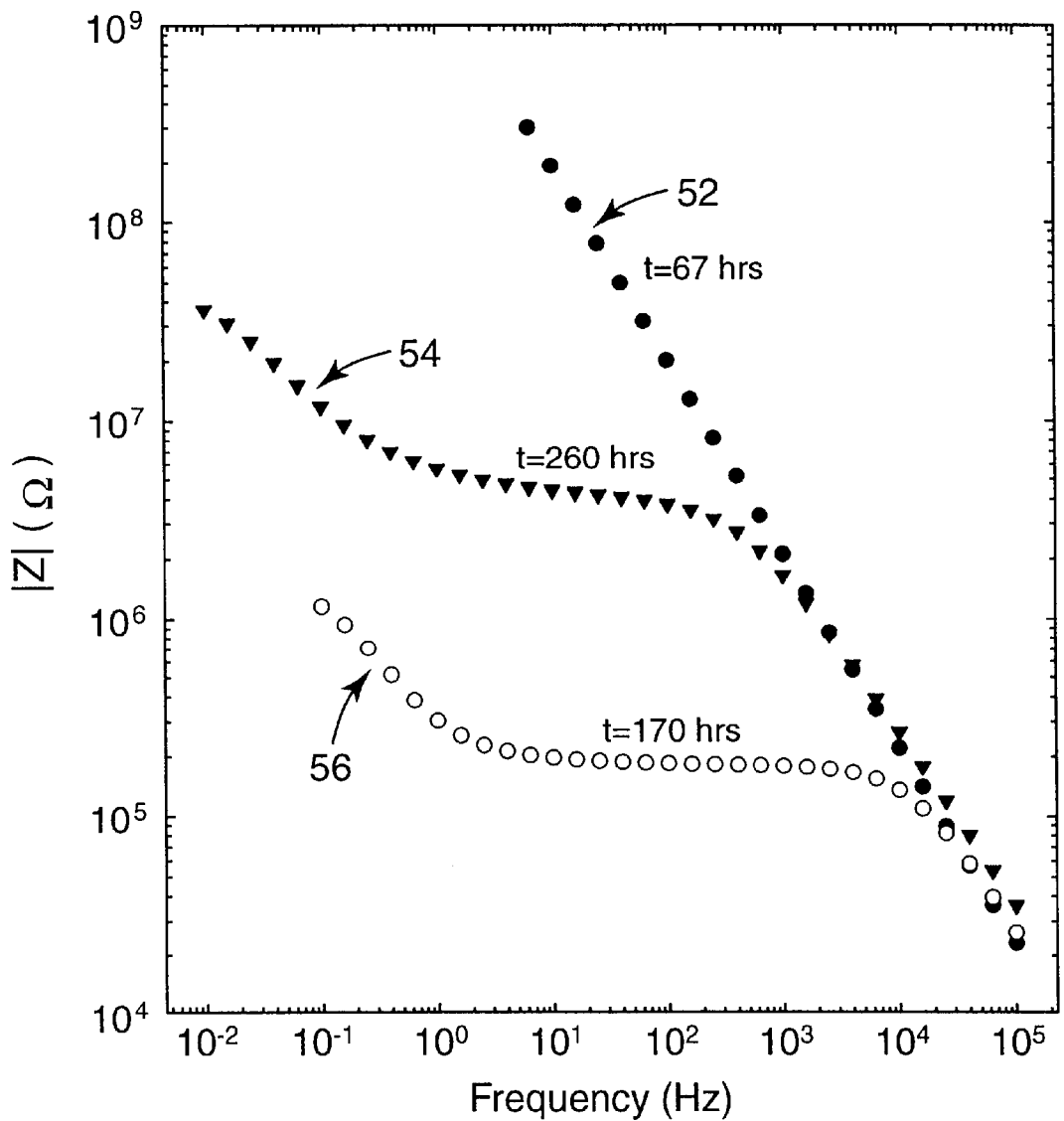
FIG. 5 is a graph of Electrochemical Impedance Spectroscopy (EIS) measurements for an aluminum panel coated with an epoxy adhesive including glycolic acid.

FIG. 5 shows a plot of measurements made in a fashion similar to that used in the measurements shown in FIG. 4 except that 30 mg of GA (per 5 grams of mixed Epoxy Adhesive A) was added to the coating. The data summary curves 52 (time=67 hours), 54 (time=260 hours), and 56 (time=170 hours) presented in FIG. 5 represent similar stages in the condition of the coating as curves 42, 44, and 46 of FIG. 4. The data of FIG. 5 indicate that the coating containing GA was breached by salt water after about 170 hours of exposure, reinforcing the earlier statement that even though GA can improve initial adhesion, that does not necessarily correlate to improved resistance to environmental stress.

Figure 6:
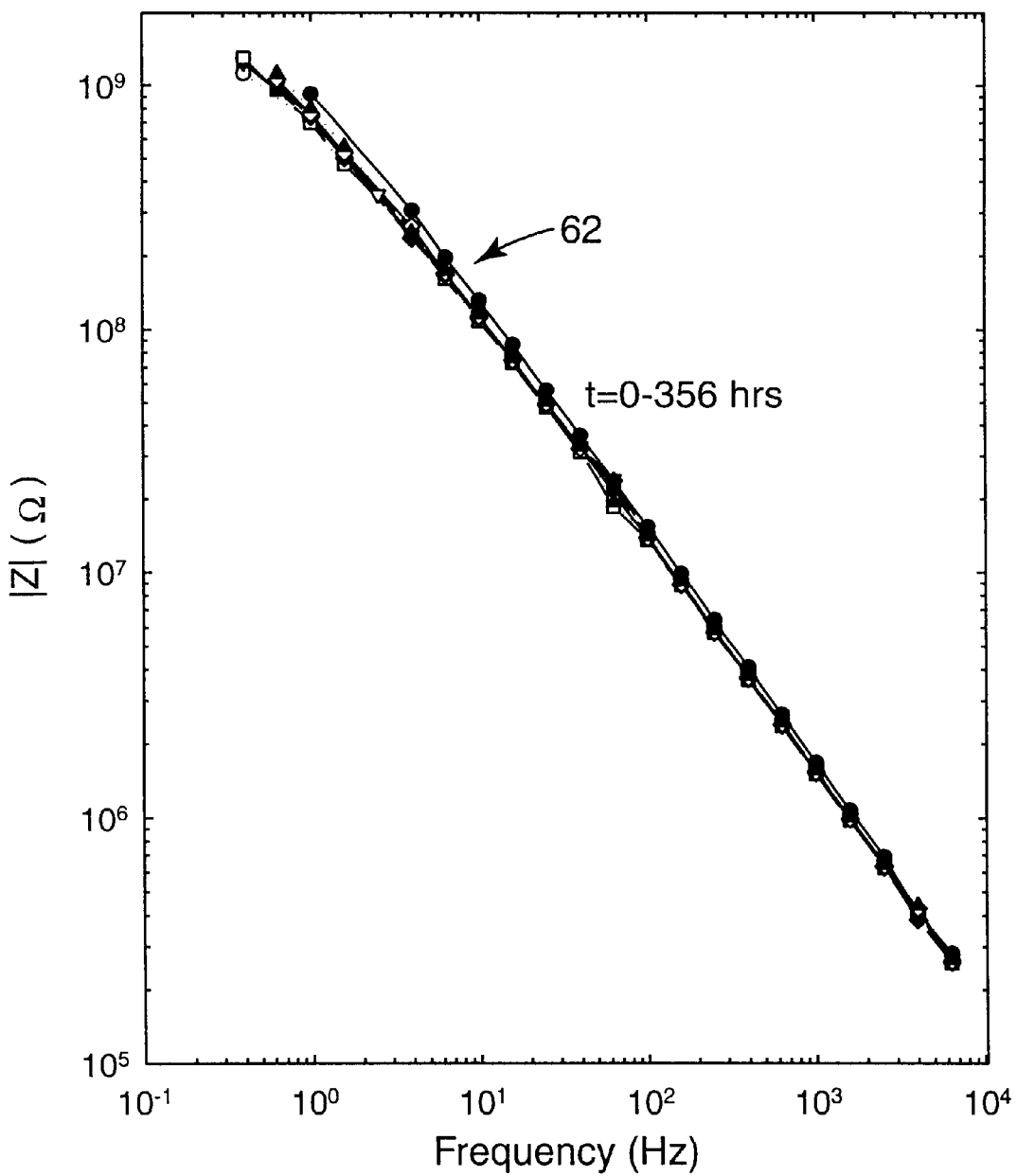
FIG. 6 is a graph of Electrochemical Impedance Spectroscopy (EIS) measurements for an aluminum panel coated with an epoxy adhesive including 16-hydroxyhexadecanoic acid.

FIG. 6 shows a plot of measurements made in a fashion similar to that used in the measurements shown in FIGS. 4 and 5 except that 30 mg of 16HHDA (per 5 grams of mixed Epoxy Adhesive A) was added to the coating. The data summary curves 62 (time=0–356 hours) presented in this figure clearly show that 30 mg of 16HHDA changes the electrochemical response of the coated electrode so that it remains essentially capacitative even after 356 hours of exposure to corrosive salt water.

Example 9

A sample of adhesive B was modified by adding 0.5 wt % octadecylthiol (added as a 10 wt % solution in heptane) and rolling the sample container on a roller mixer until the adhesive was clear and homogeneous. Samples of the modified and unmodified adhesive were coated on bare polyethylene terephthalate (PET) film (0.051-mm thickness, obtained from 3M Co., St. Paul Minn.) using a #40 wire-wound rod (obtained from RD Specialties, Webster, N.Y.). The coated adhesive samples were placed open-face in a forced-air oven at 120° C. for 2 minutes (min) to remove solvent. Pieces of gold-coated silicon wafers (<111> orientation, P-type, Boron doped test wafers, available from Silicon Sense, Inc., Nashua, N.H.,) that had been coated with a 150-nm sputtered film of gold using the procedure described in M.-W. Tsao et al., Langmuir, 13, 4317 (1997), were degreased by dipping in an ultrasound bath containing a mixture (1:1 by volume) of ethanol and chloroform, then placed in an air plasma (PDC-3×G plasma cleaner/sterilizer, obtained from Harrick Instruments, Ossining N.Y.) for 10 min. The adhesive samples were laminated to the cleaned wafers (gold side) by applying finger pressure to the wafers to force out any air bubbles and then heating the laminates in a forced-air oven maintained at 120° C. for 15 min. After removal from the oven and cooling, the adhesive and film were carefully peeled from the gold wafers. For the thiol-containing sample, release was very easy and the adhesive separated cleanly from the gold surface, leaving no visible residue. For the control (unmodified) sample, release was noticeably tighter, and although adhesive removal was fairly clean, several small spots of adhesive remained on the gold. The treated wafers were then subjected to measurement of water static contact angles, using a contact angle goniometer (obtained from Rame-Hart, Inc., Mountain Lakes, NJ) and 18 MOhm deionized water from a MILLIPORE (Bedford, Mass.) water filtration unit. Results, from averaging measurements on both sides of several 5 microliter drops, were as follows: thiol-treated, 108°; control with no thiol, 76°. (Uncoated gold wafers gave extremely low values, generally under 30°.) Essentially the same results were obtained when the contact angles were remeasured after soaking the samples in petroleum ether (boiling point 30–60° C.) for 10 min and drying under a nitrogen stream.

Infrared reflection/absorption spectra were also obtained on an identically treated gold wafer bearing the self-assembled film from the thiol-containing adhesive, except omitting the soaking in petroleum ether, using a Galaxy Series 4020 Fourier-transform infrared spectrometer (obtained from Mattson Instruments, Madison, Wis.) equipped with a liquid nitrogen-cooled MCT detector and a grazing angle accessory (obtained from Harrick Instruments) set at an 80° incident angle. A total of 1024 scans at 4 cm$^{-1}$ resolution were averaged. The spectra showed $CH_2$ bands at 2849 and 2918 cm$^{-1}$, and $CH_3$ bands at 2877 and 2964 cm$^{-1}$, with frequencies and relative intensities essentially identical to those observed for self-assembled monolayer films of octadecylthiol on gold prepared by dip coating in dilute solutions of the thiol in ethanol (see, for instance, H. Ron et al, *J. Phys. Chem. B*, 102, 9861 (1998)). These data indicate the ordered monolayer nature of the film deposited from the pressure sensitive adhesive. In contrast, spectra of a control sample prepared on gold from the adhesive without thiol showed none of these bands, instead showing only broad, weak peaks shifted to higher energy, indicative of disordered hydrocarbon adsorption. Infrared spectral measurements were repeated after soaking the two samples in petroleum ether for 10 min, then in isopropanol for 10 min, then drying under a nitrogen stream. The octadecylthiol film showed no detectable changes in its infrared spectrum upon solvent soaking, whereas the control sample prepared with no thiol showed significant reductions in infrared C-H band intensities after soaking.

Example 10

Samples (10 g) of adhesive A were modified by addition of 0.1 or 0.25 grams (g) 10 wt % solution of octadecylthiol in heptane and rolling the sample container on a roller mixer for 15 min to disperse the thiol and obtain homogeneous adhesives containing 0.1 or 0.25 wt % thiol. Using the procedures outlined in Example 9, these adhesives were coated on PET film, dried, and laminated to cleaned gold-coated silicon wafers. One set of laminates was heated in a forced-air oven at 120° C. for 15 min, allowed to cool, and the film and adhesive were peeled off. Another set was kept at room temperature overnight before removal of film and adhesive. The wafer samples, along with a control prepared using unmodified adhesive, were then subjected to measurement of water static contact angles using procedures outlined in Example 9. Contact angles were measured both before and after the samples were soaked in heptane for 15 min, then dried under a nitrogen stream. Results are shown in Table 10 below.

TABLE 10

Water Contact Angles on Gold Treated with
Octadecylthiol-Modified Rubber Cement

| | | Water Static Contact Angle | |
|---|---|---|---|
| Adhesive Sample | Post-Treatment | Initial | After Heptane Soak |
| 0.1 wt % thiol | 120° C./15 min | 102° | 104° |
| " | RT/overnight | 102° | 106° |
| 0.25 wt % thiol | 120° C./15 min | 108° | 106° |
| " | RT/overnight | 101° | 105° |
| Unmodified | 120° C./15 min | 75° | — |

Example 11

A mixture of adhesive B (10 g) and a solution of fluorochemical thiol (0.05 g) in heptane (0.34 g) was spun on a roller mixer until clear and homogeneous. Using the procedures outlined in Example 9, the adhesive was coated on PET film, dried, and laminated to a cleaned gold-coated silicon wafer. The laminate was allowed to stand for three days at room temperature, then the film and adhesive were peeled off. Water and hexadecane static contact angles were measured using procedures described in Example 9. The wafer sample was soaked in heptane for 15 min and isopropanol for 15 min, dried under nitrogen, and the contact angle measurements were repeated. Results from these measurements are shown in Table 11.

TABLE 11

Contact Angles on Gold Treated with FC Thiol-Modified Adhesive

| | Static Contact Angle | |
|---|---|---|
| Liquid | Initial | After Solvent Soak |
| Water | 107° | 109° |
| Hexadecane | 68° | 69° |

These contact angles indicate modification of the gold surface with the fluorinated thiol. Also, another gold-coated wafer sample treated under the identical conditions except left in contact with the adhesive for five days at room temperature was subjected to measurement of the infrared spectrum of the adsorbed film using the grazing angle techniques described in Example 9. The spectrum thus obtained was nearly identical to that obtained from a sample prepared by self-assembly of the thiol from dilute solution in ethanol (M.-W. Tsao et al., *Langmuir*, 13, 4317 (1997)) indicating the ordered monolayer nature of the film delivered from the adhesive.

Example 12

A mixture of adhesive C (7.5 g) and fluorochemical benzotriazole (2.5 g 1 wt % solution in 2-butanone) was spun on a roller mixer for a few minutes until clear and homogeneous. Using the same procedure, an analogous sample was prepared utilizing the fluorochemical monophosphate in place of the benzotriazole. These modified adhesives were coated and dried on PET film using procedures outlined in Example 10, and laminated on pieces of copper-coated silicon wafers (available from WaferNet, San Jose, Calif.). The laminates were heated in a forced-air oven at 120° C. for 15 min. After cooling, the film and adhesive were peeled off to leave clean treated copper surfaces. Static water contact angles were then measured using procedures outlined in Example 9. Measurements were repeated after soaking the wafer samples in heptane for 15 min and isopropanol for 15 min. Results are shown in Table 12.

TABLE 12

Water Contact Angles on Copper Treated with FC Benzotriazole- or FC Monophosphate-Modified Adhesives

| | Water Static Contact Angle | |
|---|---|---|
| Adhesive Modifier | Initial | After Solvent Soak |
| FC Monophosphate | 125° | 124° |
| FC Benzotriazole | 116° | 121° |

Results could not be obtained for the control, unmodified adhesive, as this laminate gave complete removal of the copper coating from the silicon wafer when the adhesive and film were peeled from the substrate. Thus, these additives also lower the release force for removal of the adhesive from copper.

Example 13

A mixture of 0.2 wt % fluorochemical trichlorosilane in adhesive A was prepared in a screw-top vial and spun for several minutes on a roller mixer to allow dissolution of the silane. A portion of this modified adhesive was spread on a glass microscope slide using a plastic pipette, the solvent was allowed to evaporate, and the adhesive was laminated to a piece of 0.051 mm thick PET film. The construction was allowed to stand at room temperature for three days. The film and adhesive were removed from the glass, giving easy release and exposing a clean glass surface. The treated area was found to give beading of black permanent marker ink (trade name SHARPIE, obtained from Sanford Corporation.) Furthermore, the ink could be removed by wiping with a dry tissue, and this test could be repeated several times with no erosion of ink beading behavior. In contrast, ink applied to an untreated glass slide could not be completely removed by dry wiping.

Example 14

A sample of adhesive B was modified with 0.1 wt % fluorochemical trichlorosilane, added as a 1 wt % solution in toluene, and allowed to spin on a roller mixer for 30–60 min until homogeneous. A CDAR/CFUCDAR antireflective glass coupon (available from Viratec Thin Films, Faribault, Minn.) was cleaned by immersion for several min in an ultrasonic bath containing a 1:1 (v/v) ethanol:chloroform mixture, then 10 min exposure to an air plasma using a Harrick PDC-3xG plasma cleaner/sterilizer. The glass coupon was then coated with the silane-modified adhesive using a #40 wire-wound rod, and after allowing for a few minutes drying at room temperature in air, the adhesive was laminated with a sheet of 0.051 mm thick PET film. This laminate was heated in a forced-air oven at 120° C. for 15 min, allowed to cool, and the film and adhesive were peeled off. Most of the adhesive stayed on the film, but small amounts of adhesive residue remaining on the glass were easily removed by wiping with a clean dry tissue. This also restored the antireflective properties of the glass surface. Water and hexadecane static contact angles were measured on this substrate using procedures outlined in Example 9, and gave the following results: water, 111°, hexadecane, 72°. These values are similar to those obtained on self-assembled films of this silane delivered from solution in a solvent such as heptane, and provide evidence for the presence of a fluorochemical surface on the AR glass.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An adhesive composition comprising a mixture of an adhesive component and a precursor of an in-situ self-assembled film capable of modifying a property of the surface to which the adhesive composition is applied, wherein the precursor is of the structure:

$$Y-Z-(CQ_2)_n-W-X$$

wherein:
Y is H, a halogen, a functional group capable of interacting with the adhesive component, or an organic group including a functional group capable of interacting with the adhesive component;
Z is a covalent bond or an organic linking group;
Q is H;
W is a covalent bond or an organic linking group;
X is a nonionic group that interacts with a substrate on which the adhesive composition is disposed; and
n is at least about 7;
with the proviso that $(CQ_2)_n$ does not include CHF groups or alternating $CH_2CF_2$ groups; and
wherein at least about 0.1% by weight of the precursor in neutral water at 22° C. forms a multiphase composition.

2. The adhesive composition of claim 1 wherein Y is selected from the group of H, a halogen, an amino group, a hydroxyl group, a thiol group, or a $C_1$–$C_{15}$ organic group optionally including a halogen, an amino group, a hydroxyl group, a thiol group, and combinations thereof.

3. The adhesive composition of claim 2 wherein Y is selected from the group of H, a halogen, an amino group, a hydroxyl group, a thiol group, or a $C_1$–$C_{10}$ organic group optionally including a halogen, an amino group, a hydroxyl group, a thiol group, and combinations thereof.

4. The adhesive composition of claim 3 wherein Y is F, Z is a covalent bond, and Q is F.

5. The adhesive composition of claim 1 wherein Y is a group that chemically interacts with the adhesive component.

6. The adhesive composition of claim 5 wherein Y is selected from the group of an amino group, a (meth)acryloyl group, a (meth)acrylamido group, a hydroxyl group, an oxiranyl group, a vinyl group, a thiol group, an aziridinyl group, a thiiranyl group, and combinations thereof.

7. The adhesive composition of claim 1 wherein Z is a covalent bond.

8. The adhesive composition of claim 1 wherein the organic linking group Z is a divalent alkylene group, arylene group, or mixture thereof, substituted with one or more heteroatoms, functional groups, or both, having about 2 to about 16 carbon atoms.

9. The adhesive composition of claim 8 wherein the organic linking group Z is a divalent alkylene group, arylene group, or mixture thereof, substituted with one or more heteroatoms, functional groups, or both, having about 3 to about 10 carbon atoms.

10. The adhesive composition of claim 1 wherein W is a covalent bond.

11. The adhesive composition of claim 1 wherein the organic linking group W is a divalent alkylene group, arylene group, or mixture thereof, substituted with one or more heteroatoms, functional groups, or both, having about 2 to about 16 carbon atoms.

12. The adhesive composition of claim 11 wherein the organic linking group W is a divalent alkylene group, arylene group, or mixture thereof, substituted with one or more heteroatoms, functional groups, or both, having about 3 to about 10 carbon atoms.

13. The adhesive composition of claim 12 wherein X is a thiol group, a monophosphate group, a phosphonate or phosphonic acid group, a hydroxamic acid group, a carboxylic acid group, an isonitrile group, a silyl group, a heterocyclic aromatic group, or a disulfide group.

14. The adhesive composition of claim 13 wherein X is a hydroxamic acid group.

15. The adhesive composition of claim 13 wherein X is a benzotriazole group.

16. The adhesive composition of claim 13 wherein X is a silyl group of the formula —$SiR_3$, wherein each R group is independently selected from the group of —$OCH_3$, —$OCH_2CH_3$, acetoxy, and Cl.

17. The adhesive composition of claim 1 wherein n is no greater than about 20.

18. The adhesive composition of claim 17 wherein n is about 7 to about 16.

19. The adhesive composition of claim 1 wherein the adhesive component comprises a pressure sensitive adhesive.

20. The adhesive composition of claim 19 wherein the pressure sensitive adhesive comprises an acrylic, polyolefin, styrene-butadiene block copolymer, styrene-butadiene elastomer resin, or a tackified rubber resin.

21. The adhesive composition of claim 1 wherein the adhesive component comprises a thermoset adhesive.

22. The adhesive composition of claim 21 wherein the thermoset adhesive is a structural adhesive.

23. The adhesive composition of claim 22 wherein the adhesive component comprises a two-part epoxy adhesive.

24. The adhesive composition of claim 23 further comprising a rubber modifier, an inorganic powder, glass beads, or combinations thereof.

25. The adhesive composition of claim 21 which has a storage stability of at least about one year.

26. The adhesive composition of claim 1 which will adhere to an oil contaminated surface.

27. An adhesive composition comprising a mixture of an adhesive component and a precursor of an in-situ self-assembled low-surface-energy film having a surface energy less than about 35 dynes/cm, wherein the precursor is of the structure:

$$Y-Z-(CQ_2)_n-W-X$$

wherein:
Y is H, F, or a perfluoroalkyl group of the formula $C_mF_{2m+1}$ where m is no greater than about 10;
Z is a covalent bond;
Q is H or F;
W is a covalent bond or an organic linking group;
X is a thiol group, a phosphonate or phosphonic acid group, a hydroxamic acid group, a carboxylic acid group, an isonitrile group, a silyl group, a benzotriazolyl group, a thiazolyl group, a benzimidazolyl group, a pyridinyl group, or a disulfide group; and n is at least about 7;

with the proviso that $(CQ_2)_n$ does not include CHF groups or alternating $CH_2CF_2$ groups; and wherein at least about 0.1% by weight of the precursor in neutral water at 22° C. forms a multiphase composition.

28. The adhesive composition of claim 7 wherein the self-assembled film precursor is selected from the group of 1-octadecylthiol, 1-octadecylphosphonic acid, octadecyltrichlorosilane, $C_8F_{17}(CH_2)_{11}SH$, $C_7F_{15}CH_2OCH_2CH_2CH_2SiCl_3$, $C_8F_{17}CH_2CH_2SiCl_3$, and $C_8F_{17}CH_2CH_2OPO(OH)_2$.

29. A self-priming adhesive composition comprising a mixture of an adhesive component and a precursor of an in-situ self-assembled film, wherein the precursor is of the structure:

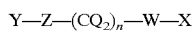
Y—Z—(CQ$_2$)$_n$—W—X wherein:

Y is a functional group capable of interacting with the adhesive component, or an organic group optionally including a functional group capable of interacting with the adhesive component;

Z is a covalent bond or an organic linking group;

Q is H;

W is a covalent bond or an organic linking group;

X is a thiol group, a phosphonate or phosphonic acid group, a hydroxamic acid group, a carboxylic acid group, an isonitrile group, a silyl group, a benzotriazolyl group, a thiazolyl group, a benzimidazolyl group, a pyridinyl group, or a disulfide group; and n is at least about 7; and wherein at least about 0.1% by weight of the precursor in neutral water at 22° C. forms a multiphase composition.

30. An adhesive bonded to a substrate comprising an adhesive component and a self-assembled film prepared from a precursor having the structure:

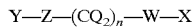
Y—Z—(CQ$_2$)$_n$—W—X wherein:

Y is H, halogen, a functional group capable of interacting with the adhesive component, or an organic group optionally including a functional group capable of interacting with the adhesive component;

Z is a covalent bond or an organic linking group;

Q is H;

W is a covalent bond or an organic linking group;

X is a nonionic group that interacts with a substrate on which the adhesive composition is disposed; and n is at least about 7;

with the proviso that $(CQ_2)_n$ does not include CHF groups or alternating $CH_2CF_2$ groups; and wherein 0.1% by weight of the precursor in neutral water at 22° C. forms a multiphase composition.

31. An adhesive composition comprising a mixture of an adhesive component and a precursor of an in-situ self-assembled film capable of modifying a property of the surface to which the adhesive composition is applied, wherein the precursor is of the structure:

Y—Z—(CQ$_2$)$_n$—W—X wherein:

Y is H, a halogen, a functional group capable of interacting with the adhesive component, or an organic group optionally including a functional group capable of interacting with the adhesive component;

Z is a covalent bond or an organic linking group;

Q is H or F;

W is a covalent bond or an organic linking group;

X is a thiol group, a phosphonate or phosphonic acid group, a hydroxamic acid group, a carboxylic acid group, an isonitrile group, a silyl group, a benzotriazolyl group, a thiazolyl group, a benzimidazolyl group, a pyridinyl group, or a disulfide group; and n is at least about 7;

with the proviso that $(CQ_2)_n$ does not include CHF groups or alternating $CH_2CF_2$ groups; and wherein at least about 0.1% by weight of the precursor in neutral water at 22° C. forms a multiphase composition.

* * * * *